United States Patent

[11] 3,540,739

[72] Inventors Yasutaka Nakajima and
Isao Kozu, Osaka, Japan
[21] Appl. No. 701,274
[22] Filed Jan. 29, 1968
[45] Patented Nov. 17, 1970
[73] Assignee Matsushita Electric Industrial Co., Ltd.
Osaka, Japan

[54] PHONOGRAPH RECORD CHANGER

8 Claims, 25 Drawing Figs.

[52] U.S. Cl. .......... 274/10
[51] Int. Cl. .......... G11b 17/08
[50] Field of Search .......... 274/23.1, 23, 10

[56] References Cited

UNITED STATES PATENTS 2,837,339 6/1958 Rhodes et al. .......... 274/23
3,197,212 7/1965 DeWeese .......... 274/10
3,129,946 4/1964 Rabinow .......... 274/23

*Primary Examiner*—Leonard Forman
*Assistant Examiner*—Steven L. Stephan
*Attorney*—Wenderoth, Lind & Ponack ABSTRACT: A phonograph record changer has a tone arm with a pickup needle adapted to move on a straight line drawn between said pickup needle and a center of a record on a turntable. Movement is produced by means of the cooperation of a rotating cylinder and a roller pressed upon said cylinder. The record changer also has a record changing mechanism capable of returning said tone arm to its rest position, feeding a record singly from a spindle onto said turntable, and starting said tone arm to lead said pickup needle to a run-in groove of the record at each record changing cycle. Operation of the record changing mechanism is initiated by detecting means in response to a quick movement of said tone arm due to entry of said pickup needle into a runout groove of the record so that said tone arm moves to its rest position, and is also initiated by said detecting means in response to arrival of said tone arm at its rest position so that the next record is fed on the turntable and said tone arm moves toward the center of said record.

INVENTORS
YASUTAKA NAKAJIMA
ISAO KOZU

BY Wenderoth, Lind & Ponack
ATTORNEYS

Patented Nov. 17, 1970 3,540,739

INVENTORS
YASUTAKA NAKAJIMA
ISAO KOZU

BY Wenderoth, Lind & Ponack
ATTORNEYS

INVENTORS
YASUTAKA NAKAJIMA
ISAO KOZU

BY Wenderoth, Lind & Ponack
ATTORNEYS

INVENTORS
YASUTAKA NAKAJIMA
ISAO KOZU

BY Wenderoth, Lind & Ponack
ATTORNEY

INVENTORS
YASUTAKA NAKAJIMA
ISAO KOZU

BY Wendroth, Lind & Ponack
ATTORNEYS

*INVENTORS*
YASUTAKA NAKAJIMA
ISAO KOZU

BY *Wenderoth, Lind & Ponack*
ATTORNEY

INVENTORS
YASUTAKA NAKAJIMA
ISAO KOZU

BY Wendroth, Lind & Ponack
ATTORNEYS

INVENTORS
YASUTAKA NAKAJIMA
ISAO KOZU

BY Wenderoth, Lind & Ponack
ATTORNEYS

INVENTORS
YASUTAKA NAKAJIMA
ISAO KOZU

BY Wenderoth, Lind & Ponack
ATTORNEYS

*INVENTORS*
YASUTAKA NAKAJIMA
ISAO KOZU

BY Wenderoth, Lind & Ponack
ATTORNEY

INVENTORS
YASUTAKA NAKAJIMA
ISAO KOZU

BY *Wenderoth, Lind & Ponack*
ATTORNEYS

INVENTORS
YASUTAKA NAKAJIMA
ISAO KOZU

BY Wenderoth, Lind & Ponack
ATTORNEYS

INVENTORS
YASUTAKA NAKAJIMA
ISAO KOZU

BY Wenderoth, Lind & Ponack
ATTORNEYS

INVENTORS
YASUTAKA NAKAJIMA
ISAO KOZU

BY *Wenderoth, Lind & Ponack*
ATTORNEYS

PHONOGRAPH RECORD CHANGER

BACKGROUND OF THE INVENTION

1. Field of the Invention

This invention relates to a phonograph record changer which executes a record changing cycle which includes returning a tone arm to its rest position after the completion of the playing of one record, feeding a record from a stack to a playing position, starting the tone arm to the position where a pickup needle engages a run-in groove of the record to be played, and shutting off the record changing cycle on completion of the playing of the last record on the stack. More particularly, it relates to a tone arm which makes it possible to move the pickup needle on a straight line joining the center of the record and the point where the pickup needle is initially placed on the edge of the record positioned on the turntable.

2. Description of The Prior Art

In conventional phonograph constructions, a phonograph pickup is mounted on an arm which is pivotally secured, at one end thereof, to a fixed support so that the needle can trace the record groove while traversing an arc-shaped path. The angle between the longitudinal center line of the pickup and the line tangent to the record groove at the point where the needle comes in contact with the groove, changes as the needle travels. These changes in said angle cause tracking errors which may result in tracking distortions.

An offset arm, which is commonly used to reduce the tracking errors, produces a horizontal force against the side of the record groove which may increase the undesirable side pressure between the needle and the record groove.

Various attempts have heretofore been made to correct such an undesirable condition and to eliminate the resulting tracking errors. For example, a tone arm has been supported on a carriage which moves on ball bearings in order to eliminate such tracking errors, but said embodiment has caused much more friction in association with the movement of the tone arm than is produced by a conventional, pivoted tone arm. The increased friction results in an increased transverse pressure being inflicted upon both the needle and the record groove and as a result causes the needle to jump out of the record groove. Thus, the prior art does not contain any phonograph pickup capable of eliminating said tracking errors by imparting a low vertical force, *e.g.* 1 gram, to the needle.

A conventional phonograph record changer having an automatic mechanism commonly comprises a driving means in the form of a large gear capable of meshingly engaging with a small gear on the turntable boss. The large gear is usually engaged with the small gear by the accelerated movement of the tone arm acting in response to the entry of the pickup needle into the usual quick runout groove of a played record. This will mean that the transverse pressure inflicted upon both the tone arm and the pickup needle causes the needle to jump out of the record groove if the vertical force applied to the needle is low. Such a situation has prevented a phonograph record changer, employing a high grade phonograph tone arm capable of operating with less than 1 gram of a vertical force on the needle from being produced.

SUMMARY OF THE INVENTION

Therefore, the principal object of the present invention is to provide an improved and simplified phonograph record changer which eliminates the undesirable tracking error and side pressure and which can execute the record changing cycle with only a low vertical force being imparted to the needle.

It is another object of the present invention to provide a phonograph record changer having a pickup needle which can move on a straight line from the edge of a record to the center of the record.

It is still another object of the present invention to provide a phonograph record changer capable of executing the record changing cycle, including bringing the pickup needle to a position along the straight line from the edge of the record to the center, in accordance with the first groove of the various size records, returning said pickup needle to its rest position after the completion of the reproduction of the record, feeding the next record from the stack to the playing position, and shutting off the record changing cycle after the last record on the stack has been played.

The present invention achieves these objectives by employing a phonograph record changer, according to the present invention, which comprises, as basic components, a tone arm vertically pivotally mounted on a bracket means, said bracket means being horizontally pivotally mounted on a carriage means, said carriage means being movably disposed so as to travel along a path parallel with the straight line between the point where the pickup needle is placed on the edge of the record and the center of the record; a rotatable cylinder which is rotatably supported in the phonograph chassis, and which is always rotated in one direction and which has its axis of rotation disposed in parallel with the path of said carriage means; a roller supported by said bracket means such that it makes rolling contact with said rotatable cylinder and has its axis of rotation arranged at right angles with respect to the straight line joining said pickup needle and the axis of the horizontal pivotal movement of said tone arm.

A phonograph record changer, according to the present invention, also has an improved and simplified automatic mechanism capable of executing the record changing cycle, including returning the tone arm to its rest position after playing each record, feeding the next record from the stack to the playing position, positioning the tone arm so that the pickup needle engages with the run-in groove of the next record to be played, and shutting off the record changing cycle upon completion of the last record on the stack. Said automatic mechanism according to the present invention comprises:

a first means for causing said tone arm to pivot, vertically, so that said pickup needle can be both lifted away from the record in order to disengage from the groove of the record, and to be lowered to the record in order to engage with the groove;

a second means for causing said carriage means to move horizontally along a path parallel with the axis of said rotatable cylinder;

feeding means for feeding records, one at a time, to said turntable; and a third means for locating said tone arm at a position where said pickup needle is just above the run-in groove of the record.

In the phonograph record changer, according to the present invention, the tone arm is slightly inclined with respect to its axis of horizontal, pivotal movement and simultaneously, the rotational axis of the roller is inclined with respect to the rotational axis of the rotatable cylinder so that a component of the rotating force of the cylinder is imparted to the roller in the direction in which the carriage means is moved. This causes the rotational axis of the roller to become aligned parallel with the rotational axis of the rotatable cylinder.

As a result, the tone arm, bracket means and roller, unitarily and pivotally mounted on the carriage means, move along a straight line parallel to the axis of the rotatable cylinder in such a way that the pickup needle moves in a straight line between the point where the pickup needle is placed on the edge of the record and the center of the record. In the present invention, the carriage means is moved by a force other than the pressure imparted to the pickup needle by the lead of the spiral record groove. That is, the phonograph record changer, according to the present invention, causes the carriage means to move by a force derived from the rotation of the rotatable cylinder. Therefore, the record changing cycle is initiated without imparting any undesirable transverse pressure to either the pickup needle or the tone arm as a result of the accelerated movement of the carriage means in response to the entry of the pickup needle into the usual quick runout groove of a played record.

The automatic mechanism of the present invention is applicable to phonograph record changers employing a high grade tone arm with only 1 gram of vertical force being applied to the pickup needle.

A phonograph record changer, according to the present invention, further comprises a safety mechanism which will be illustrated in detail hereinafter. Said safety mechanism is provided so that a record does not descend along the record supporting spindle, from the stack to the turntable, before the tone arm returns to its rest position. Consequently, there is no chance of a collision between the tone arm moving on its way to its rest position and the record descending along the record supporting spindle. The safety mechanism thus prevents damage to the tone arm and the record which would be caused by a collision therebetween.

BRIEF DESCRIPTION OF THE DRAWINGS

These and other objects of the invention will be apparent upon consideration of the following description taken together with the accompanying drawings in which.

DESCRIPTION OF THE PREFERRED EMBODIMENT

Figure 1:
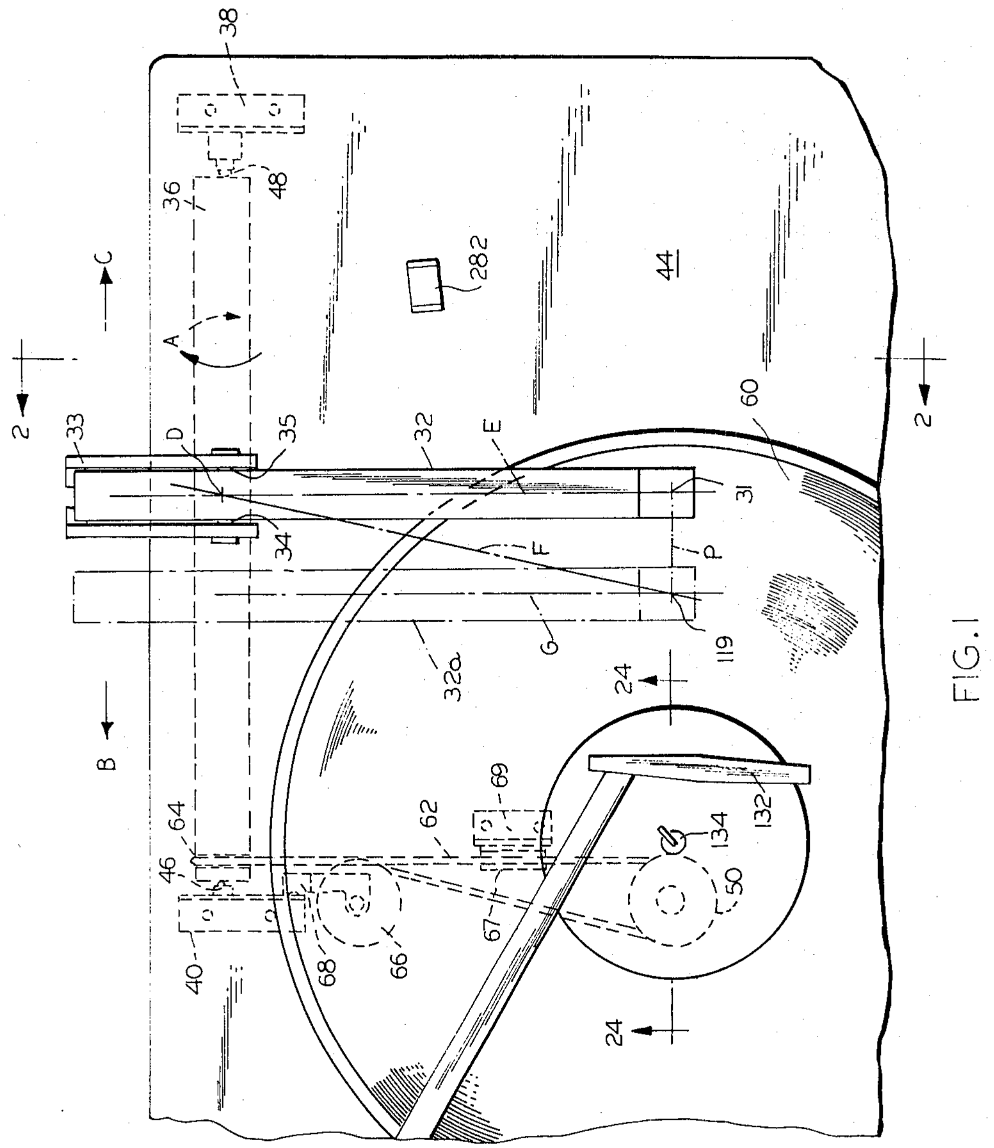
FIG. 1 is a plan view of a part of the phonograph record changer according to the present invention.

Referring now to FIGS. 1, 2, 8, 19, 21 and 24, a turntable 56 is rotatably mounted on a phonograph chassis 44 to support and rotate a conventional record 60 in the usual way. A carriage 78 is provided with four shafts 70, 72, 74 and 76 which have guide rollers 80, 82, 84 and 86 rotatably mounted thereon, respectively. The side plates 38 and 40 are mounted on a subchassis 42, securely fixed to the phonograph chassis 44. Two guide bars 88 and 90 are rigidly connected between said side plates 38 and 40. The carriage 78 is provided with a pair of guide ears, 91 in FIG. 2 and 91*a* in FIG. 7, in order to prevent the carriage 78 from being moved upwardly by, for example, a rough manipulation of the tone arm 32. Therefore, the carriage 78 is movable in the direction of arrow B or C, FIG. 21, while being guided by these guide rollers, guide bars and guide ears. A bracket 96 is rotatably mounted on the pivots 98 and 100 which are secured to the upper and lower plane portions of the carriage 78 respectively, *i.e.* along the dot–dash line D in FIG. 2. A tone arm bracket 33 is secured to the bracket 96 by screws 92 and 94. A tone arm 32 is pivotally mounted on the tone arm bracket 33 by horizontal pivots 34 and 35 and a needle 31 of a pickup 30 is mounted on the tone arm 32.

Figure 21:
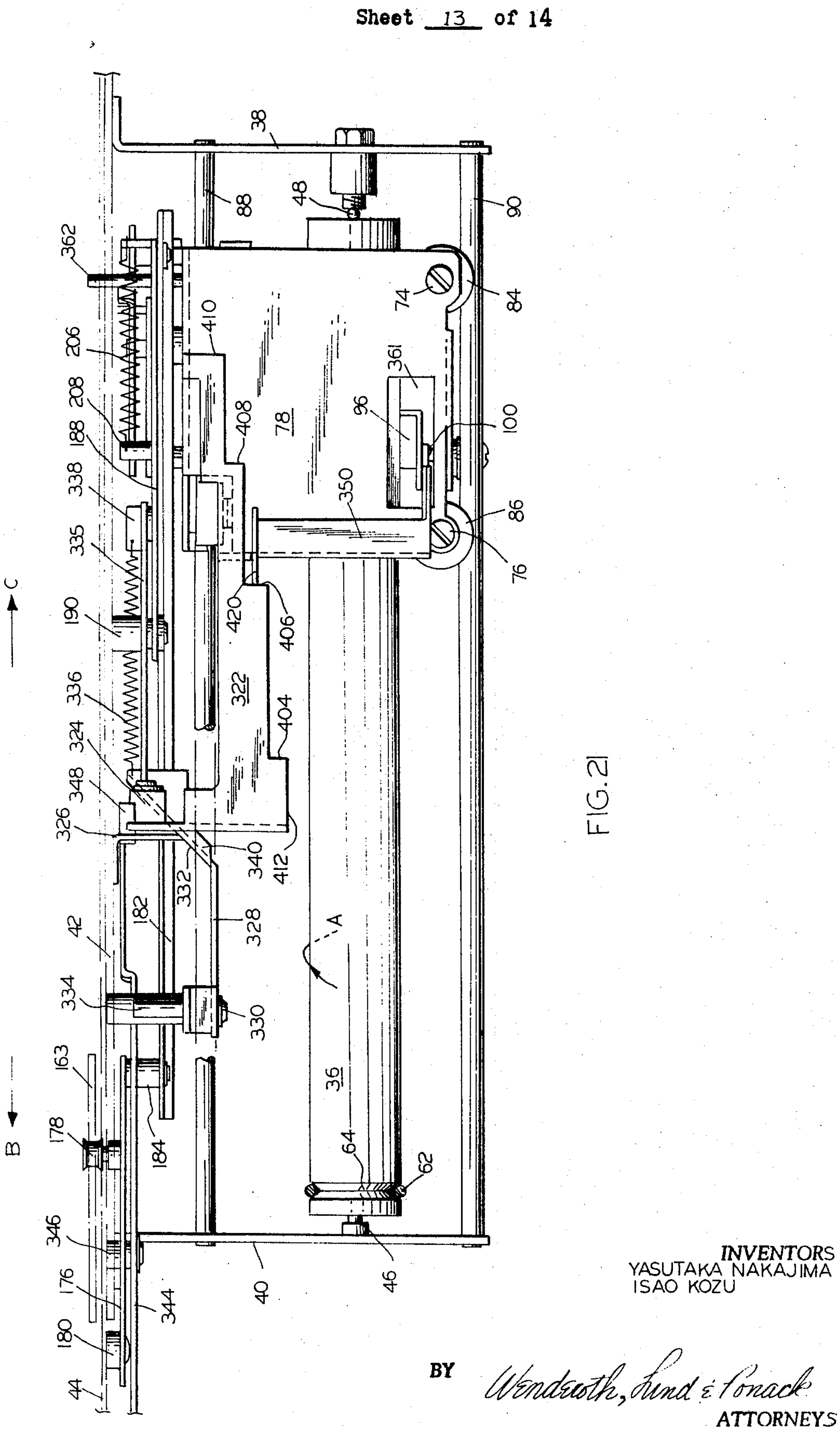
FIG. 21 is a vertical, sectional view of the mechanism of FIG. 18.

A rotatable cylinder 36 is rotatably mounted on the pivots 46 and 48 secured to said side plates 38 and 40, as shown in FIG. 21, and has its axis of rotation disposed in parallel with the path of the carriage 78. A pulley 50 having a V-shaped groove, is fixed on a shaft 52 of a rubber covered idler wheel 54. Said idler wheel is rotatably mounted on a boss 58 fixed to the phonograph chassis 44 and is rotated by frictional engagement with a central hollow boss 126. An endless belt 62 is connected between the V-shaped groove of pulley 50 and a V-shaped groove 64 on the cylinder 36 so that the cylinder 36 is normally rotated in the direction of arrow A in FIG. 2. Two guide pulleys 66 and 67 are rotatably mounted on a bracket 68, secured to the side plate 40, and a bracket 69, secured to the chassis 44, respectively, in order to guide the movement of the endless belt 62 so that it can not slip off the pulley 50 nor out of the V-shaped groove 64 on the cylinder 36.

Figure 2:
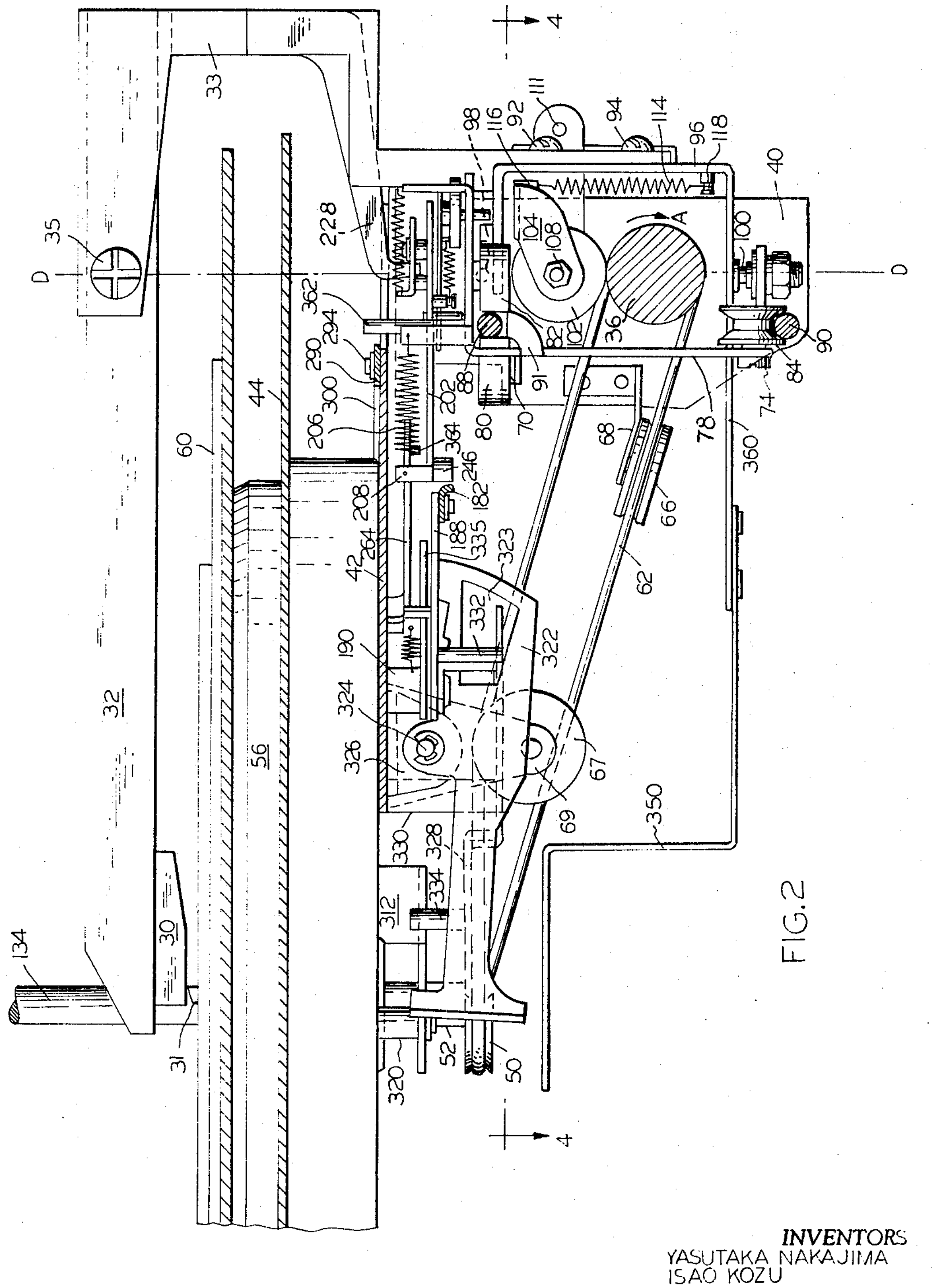
FIG. 2 is a vertical, sectional view taken along the line 2–2 in FIG. 1.
Figure 3:
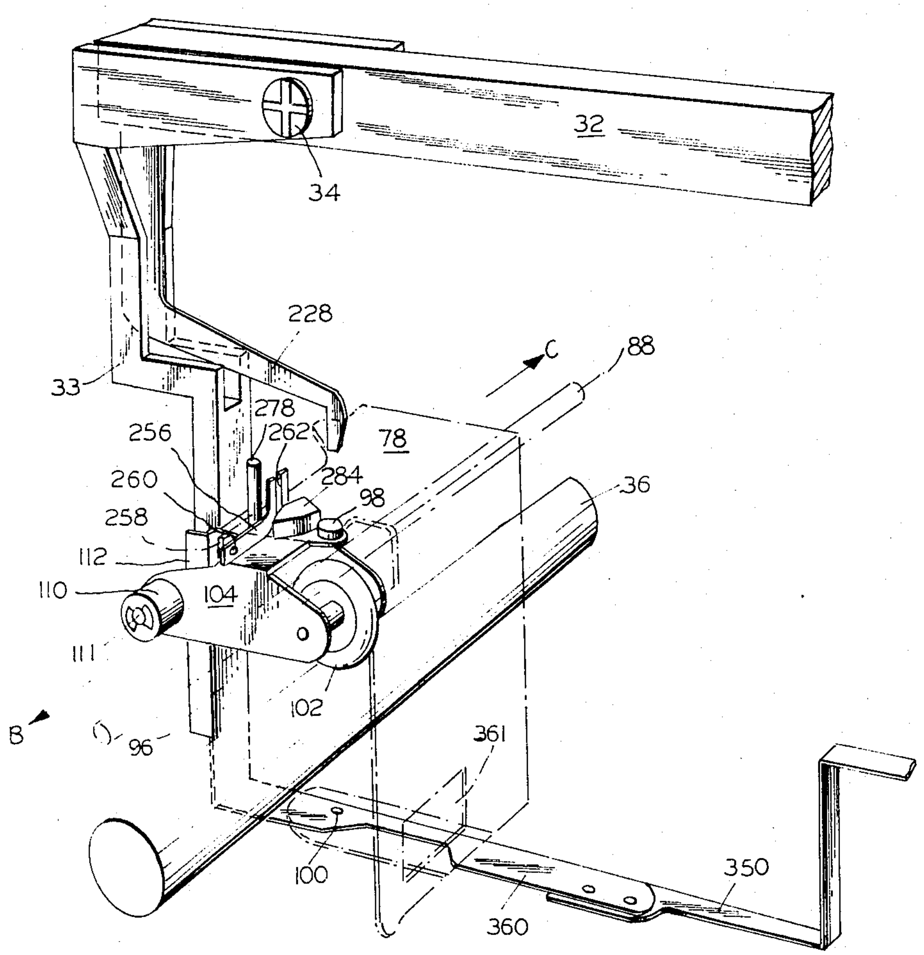
FIG. 3 is a perspective view of a tone arm assembly of the present invention.
Figures 4, 14, 15, 16:
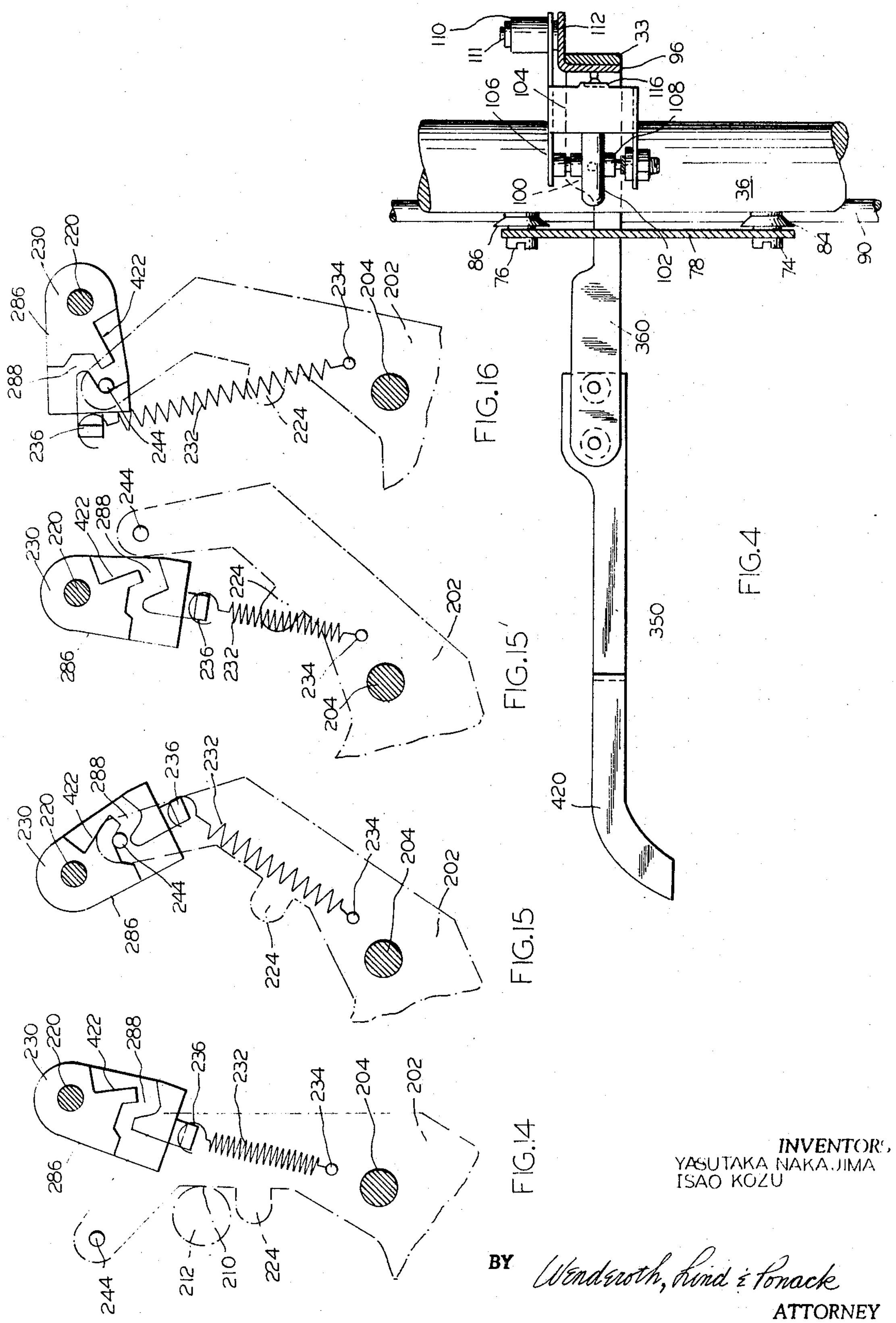
FIG. 4 is a partial cross-sectional view taken along the line 4–4, in FIG. 2.
FIGS. 14, 15, 15′ and 16 are plan views of the parts of the tone arm actuating mechanism in various positions.

Referring to FIGS. 2, 3 and 4, a roller 102 is supported by a U-shaped bracket 104 so as to rotate smoothly about pivots 106 and 108. In FIGS. 2 and 4, it will be seen that a boss 110 is fixed to one end of the U-shaped bracket 104 and is rotatably mounted on a shaft 111, fixed to a plane portion 112 of said bracket 96, thereby permitting vertical pivotal movement of the U-shaped bracket 104 about the shaft 111. A spring 114 is tensioned between a tab 116 on the U-shaped bracket 104 and a pin 118 fixed to the bracket 96. Said spring presses the roller 102 downwardly against the rotatable cylinder 36 with a force sufficient to cause the roller 102 to rotate as a result of the frictional engagement between the roller 102 and the cylinder 36. The roller 102 is positioned such that its rotational axis is at right angles with respect to the dot–dash line E which connects the needle 31 to the axis D of the horizontal pivotal movement of the tone arm 32, FIG. 1. It will be understood that the tone arm 32, the tone arm bracket 33, the bracket 96, the U-shaped bracket 104 and the roller 102 can thus unitarily make a pivotal movement about the dot–dash line D in FIG. 2. These members will be resisted, during their pivotal movement, by the frictional force of the pivots 98 and 100 and by the friction between the roller 102 and the cylinder 36. Said frictional force of the pivots 98 and 100 can be reduced by employing as the material therefore a hard material such as steel. The friction between the roller 102 and the cylinder 36 can be limited to rolling friction alone by positioning the contact point between the roller 102 and the rotatable cylinder 36 on the dot–dash line D. In this way the resistance encountered during their rotation can be minimized. Therefore, the tone arm 32 can make a smooth pivotal movement in the horizontal plane.

When the needle 31, placed on the record 60, travels along the record groove to a position 119, as shown in FIG. 1, the tone arm 32 is inclined and the dot–dash line E, connecting the needle 31 to the axis D of the horizontal pivotal movement of the tone arm 32, will be positioned as shown by the dot–dash line F in accordance with the invention. This will cause inclination of the rotational axis of the roller 102 with respect to the rotational axis of the cylinder 36. Since the cylinder 36 is rotating in the direction of arrow A, FIG. 2, a component of the rotating force of the cylinder 36 is imparted to the roller 102 in the direction of arrow B. As a result, the carriage 78 is urged to move along the guide bars 88 and 90 in the direction of arrow B until, finally, the dot–dash line F corresponds to the dot–dash line G, which is at right angles with respect to the rotational axis of the cylinder 36. In other words, movement of the carriage 78 ceases when the tone arm 32 moves to position 32*a*, as shown in FIG. 1. In this position of the tone arm 32, the rotational axis of the roller 102 is parallel with that of the cylinder 36, as shown in FIG. 4.

As the needle 31 gradually and continuously moves along the spiral record groove during the playing of the record, the carriage 78 gradually and continuously moves in the direction of arrow B in such a manner that the dot–dash line E, connecting the needle 31 with the axis D of the horizontal pivotal movement of the tone arm 32, is constantly maintained at substantially right angles with respect to the rotational axis of the cylinder 36. During this time, the needle 31 describes a track as shown by the radial line P without causing any tracking errors. Further, the carriage 78 is moved by a force other than the pressure which is imparted to the needle 31 by the lead of the spiral record groove, that is, the force derived from the rotation of the rotatable cylinder 36. Therefore, the phonograph tone arm 32 of the structure, as described above, has a superior construction in which the needle 31 thereof is almost free from forces, either inside or outside, of the record groove. The device, according to this invention, is applicable to phonograph record players employing a high-grade phonograph tone arm which imparts a low vertical force of only about 1 gram to the needle.

The following description is directed to the detecting means which detects the accelerated movement of the tone arm and actuates the driving means for the apparatus in response to an entry of the pickup needle into the usual quick runout groove at the end of a played record, said driving means comprising a large gear and a small gear.

Figure 5:
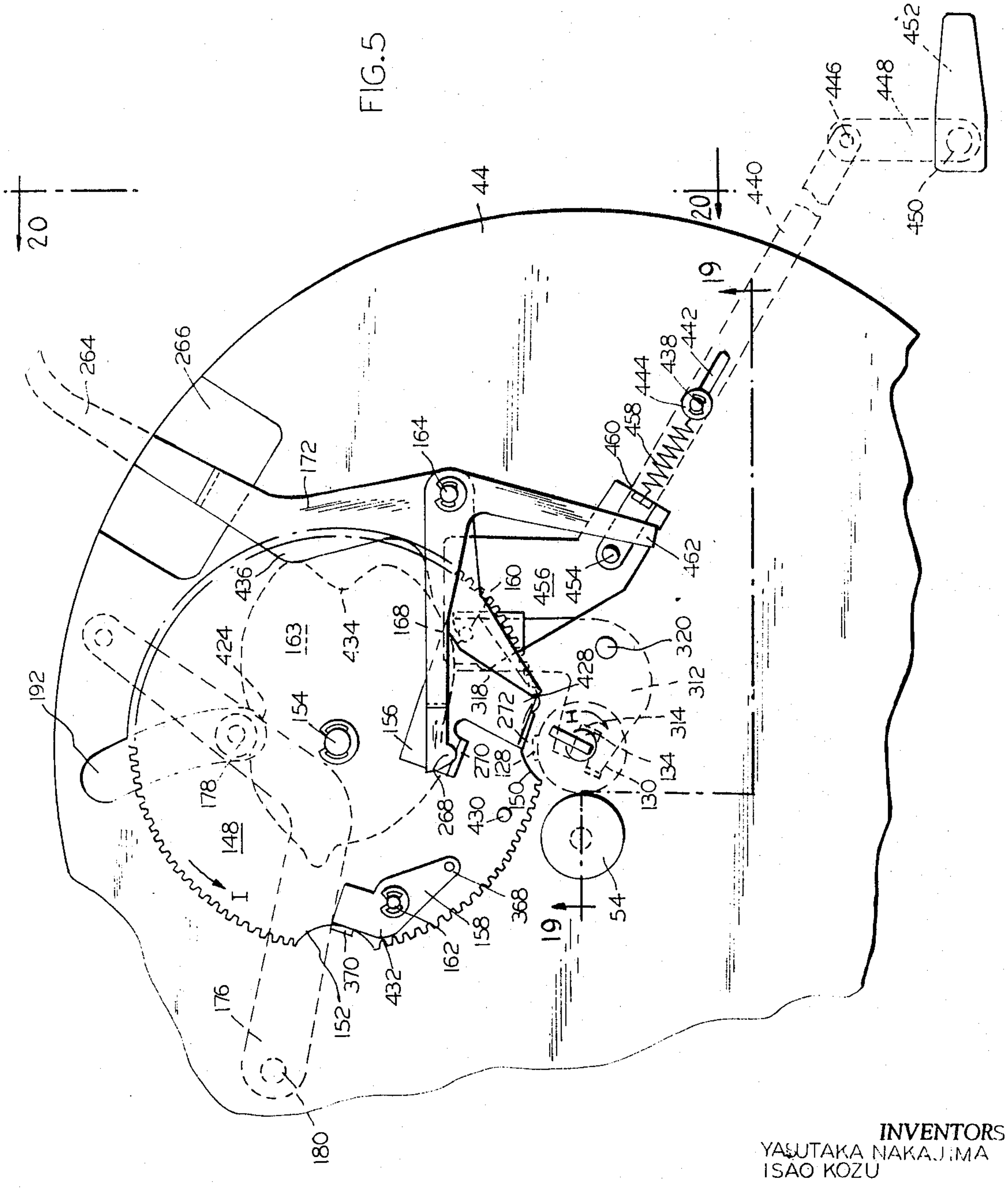
FIG. 5 is a plan view of part of the phonograph record changer with the turntable removed showing the internal structure of the present invention.
Figure 19:
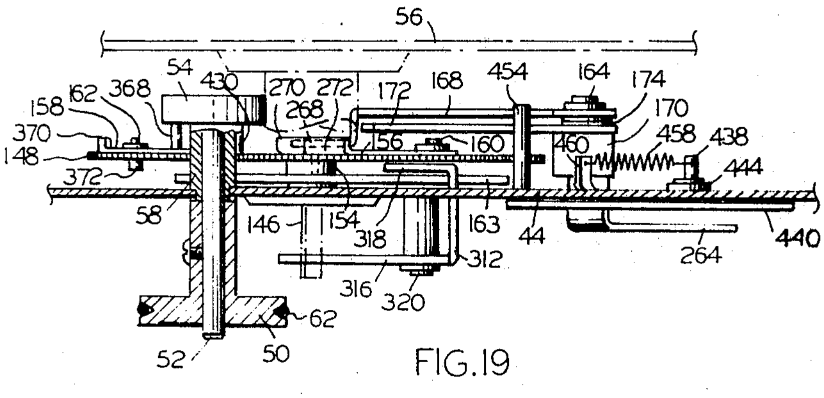
FIG. 19 is a partial, vertical sectional view taken along the line 19–19 in FIG. 5.
Figure 20:
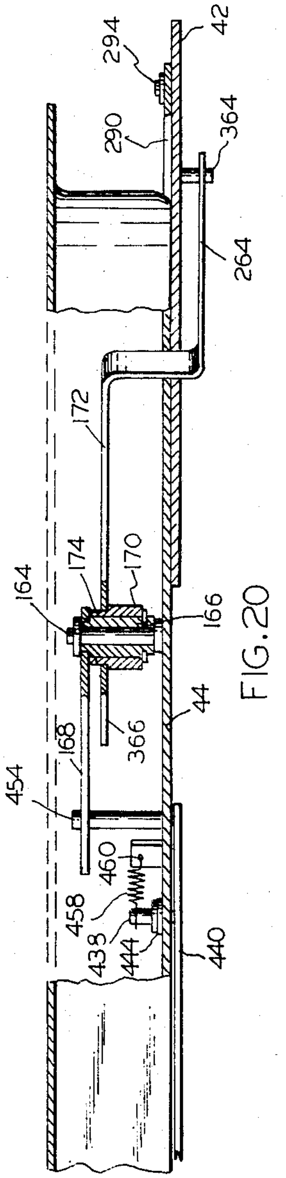
FIG. 20 is a partial, vertical sectional view taken along the line 20–20 in FIG. 5.
Figure 24:
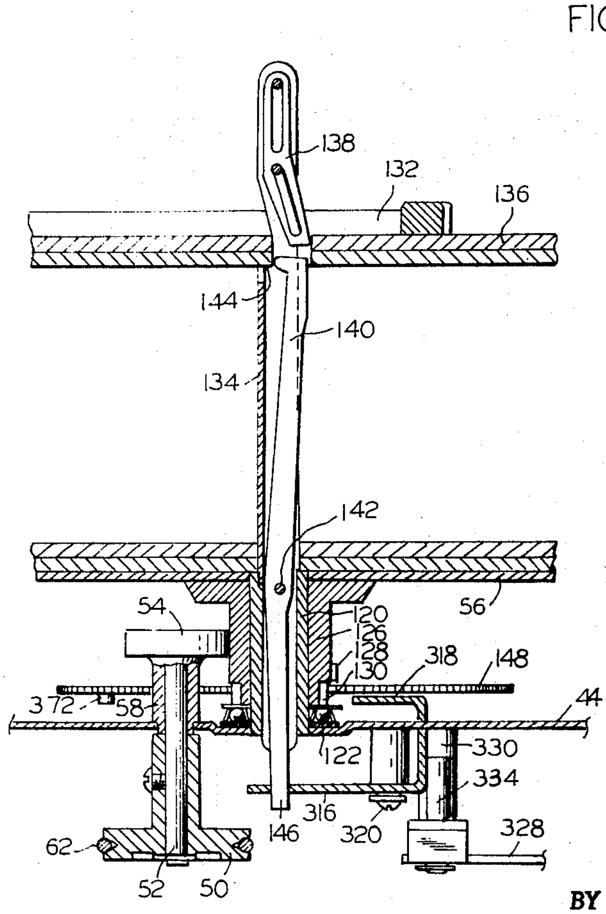
FIG. 24 is a vertical sectional view of the turntable and spindle supporting device taken along the line 24–24 in FIG. 1.

In FIGS. 5 and 24, the turntable 56, having a central hollow boss 126 secured to the bottom thereof, is rotatably mounted on a vertical tubular pedestal 120 fixed to the phonograph chassis 44, and rests on a ball bearing ring 122 positioned on the phonograph chassis 44. A projection 128 and a small gear 130 are attached to the lower end of the central hollow boss 126. Rotation can be imparted to the turntable 56 in the direction of arrow H in any well known manner, for example, by means of a motor-driven friction wheel (not shown) in engagement with the inner surface of the depending peripheral edge of the turntable 56. A large gear 148 having two cutouts, *i.e.* a first cutout 150 and a second cutout 152, located on the periphery thereof, is rotatably mounted on a shaft 154 fixed to the chassis 44. Two clutch levers, *i.e.* a first clutch lever 156 and a second clutch lever 158, are pivotally mounted on pins 160 and 162, respectively, which are fixed to the large gear 148 as shown in FIG. 5. A cam 163 is securely fixed to the gear 148. As shown in FIGS. 5, 19 and 20, a shaft 164 is securely fixed to the chassis 44 and a boss 166, having a friction lever 168 secured thereto, is rotatably mounted on the shaft 164. A boss 170, to which a detection lever 172 is securely fixed, is rotatably mounted on the boss 166. A friction spacer 174, of a material such as felt, is interposed between the friction lever 168 and the detection lever 172, as shown in FIG. 20, to insure that the friction lever 168 and the detection lever 172 normally rotate as a unit about the shaft 164.

Referring now to FIG. 5, the first cutout 150 is positioned at the point where the small gear 130 would meet with the gear 148 so that the large gear 148 does not move even when the small gear 130 is rotating. As the record is played, the needle gradually moves along the spiral groove of the record and the carriage 78 is gradually urged in the direction of arrow B, FIG. 6. When the needle 31 is near the innermost portion of the spiral record groove, an ear 208 on the actuating lever 202, which will be explained later with reference to FIG. 7, and which is mounted on the carriage 78, abuts a leg 264 of the detection lever 172 which extends downwardly through an opening 266 in the chassis 44 causing the detection lever 172 to gradually rotate about the shaft 164 in the counterclockwise direction. At the same time, the frictional force resulting from the frictional spacer 174 being positioned between the detection lever 172 and the friction lever 168 causes the friction lever 168 to gradually rotate counterclockwise about the shaft 164. Said rotation causes a downwardly bent extention 268 on the friction lever 168 to push against an ear 270 on the first clutch lever 156 causing said clutch lever to rotate counterclockwise about the pin 160. As the first clutch lever 156 is successively rotated counterclockwise, another ear 272 on the clutch lever 156 moves towards a position at which it comes into contact with the projection 128 which is rotating in the direction of arrow H in accordance with the rotation of the hollow boss 126 of the turntable 56. However, the needle 31 moves only at a slow rate of speed while tracing the modulated groove of the record, and therefore the first clutch lever 156 also rotates only at a slow rate. For this reason, the ear 272 is kicked back in the clockwise direction by the projection 128.

The needle 31 moves at a high rate of speed when it is finally guided into the innermost runout groove of the record, which has a large pitch compared with the modulated grooves. The movement of the carriage 78, in the direction of arrow B, is directly dependent upon the movement of the needle 31 and a quick movement of the needle causes a quick rotation of the detection lever 172. Such quick rotation is imparted to the friction lever 168 and results in the first clutch lever 156 rotating a great degree. This causes the ear 272 of the lever 156 to collide with the projection 128. Consequently, the large gear 148 is slightly rotated in the direction of arrow I due to the rotation of the projection 128 in the direction of arrow H. Therefore, the large gear 148 is brought into a meshing engagement with the small gear 130 and thereafter is rotated in the direction of arrow I in accordance with the rotation of the small gear 130 in the direction of arrow H until the second cutout 152 is positioned at the point where gear 148 would mesh with the small gear 130, thus stopping the rotation of the large gear 148.

The carriage 78 according to this invention is moved by a force resulting from a component of the rotating force which is imparted to the roller 102 by the rotatable cylinder 36. The movement of the carriage 78 actuates the driving means for the automatic mechanism in the form of a large gear 148 in response to the entry of the pickup needle 31 into the runout groove of a played record. In other words, said carriage 78 causes the detection lever 172 to rotate counterclockwise about the shaft 164. The counterclockwise rotation of the detection lever 172 effects a meshing engagement between the small gear 130 and the large gear 148. The above arrangement makes it possible for the pickup needle 31 to be quite free from any undesirable side pressure. Therefore, it is possible to attain an automatic operation of the tone arm having a phonograph pickup which imparts only a small vertical force of about 1 gram to the needle. Such a novel feature could not be realized with the record players known in the prior art which had an automatic mechanism which was operated by force to forward the needle to the center of the record along the spiral record groove.

Figure 6:
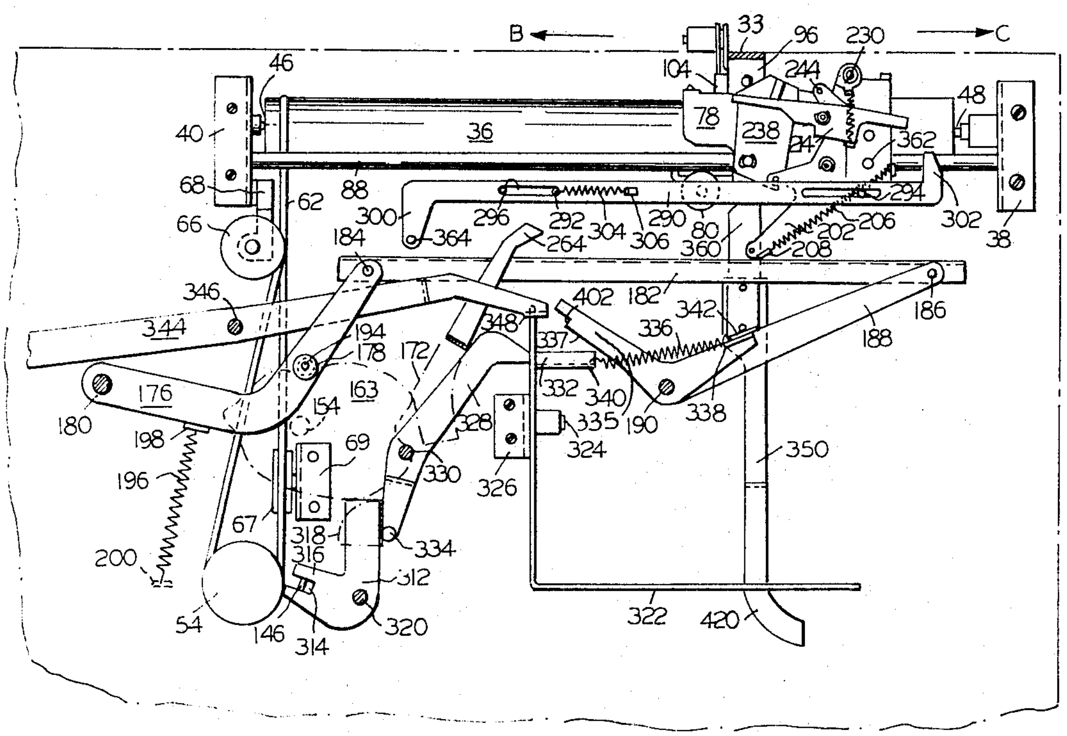
FIG. 6 is a bottom plan view of part of the automatic mechanism according to the present invention.

As seen in FIGS. 5 and 6, a follower lever 176 is pivotally mounted on a shaft 180 fixed to the chassis 44, and has one end thereof pivotally connected to one end of a link 182 by a pivot pin 184. The other end of the link 182 is pivotally mounted on a pin 186 of a lever 188 which in turn is pivotally mounted on a shaft 190 fixed to subchassis 42 (FIG. 2). These members move conjointly so that the link 182 moves in a parallel motion relative to the rotational axis of the rotatable cylinder 36 when the follower lever 176 rotates. A roller 178 is rotatably mounted on the follower lever 176 on a pin 194 which is fixed to the follower lever 176 and which protrudes through an opening 192 in the chassis 44 in order to engage the cam 163. A spring 196 is tensioned between an ear 198 on the follower lever 176 and a bent ear portion 200 on the chassis 44. Said spring 196 imparts a force tending to produce clockwise rotation of the follower lever 176 so that said roller 178 engages the peripheral surface of the cam 163. As the large gear 148 rotates in the direction of arrow I, the cam 163, which is securely fixed thereto, acts against said follower lever 176 to rotate it in a counterclockwise direction against the spring load of said spring 196. The spring 196 will move the follower lever 176 clockwise back toward the cam as the roller 178 follows the profile. Thus, lever 176 will move counterclockwise and clockwise according to the profile of cam 163. Therefore, said link 182 makes a reciprocating movement toward and away from the cylinder 36 while remaining parallel to the rotational axis of the cylinder 36.

The following description will explain the tone arm lifting means which lifts the tone arm 32 in order to disengage the pickup needle 31 from the record when the playing of the record is completed.

Figure 7:
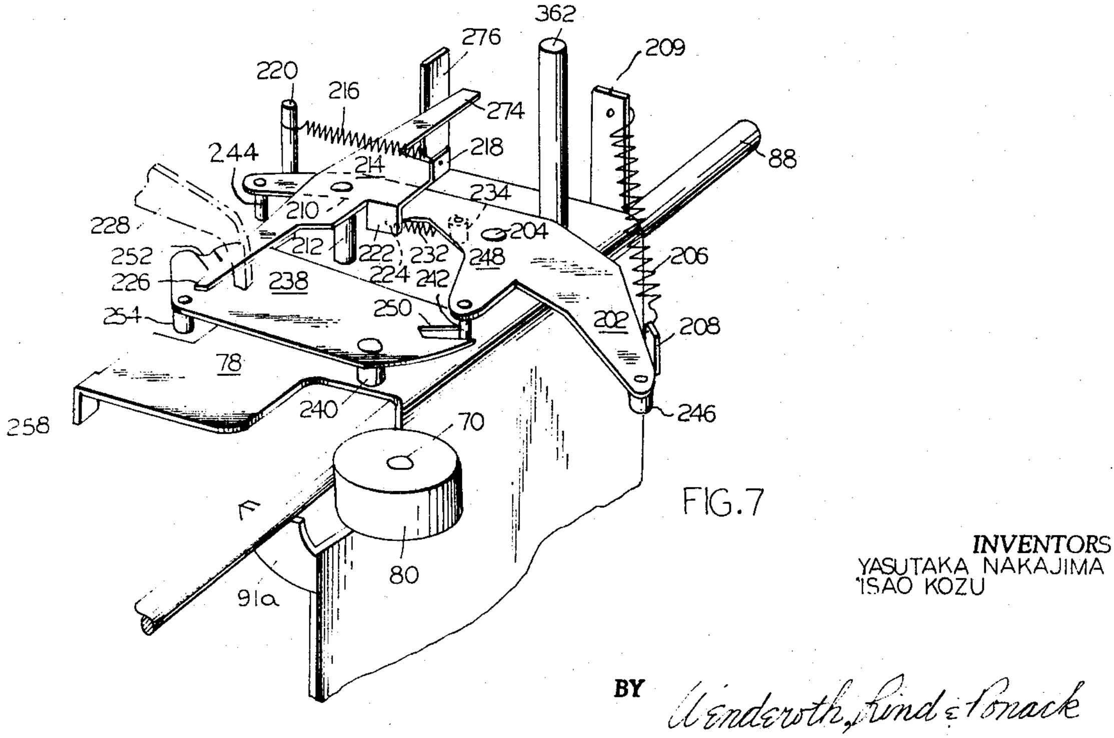
FIG. 7 is a perspective view of a tone arm actuating mechanism for automatically urging the tone arm, mounted on a carriage, to move to its rest position and to a position on a record.
Figure 8:
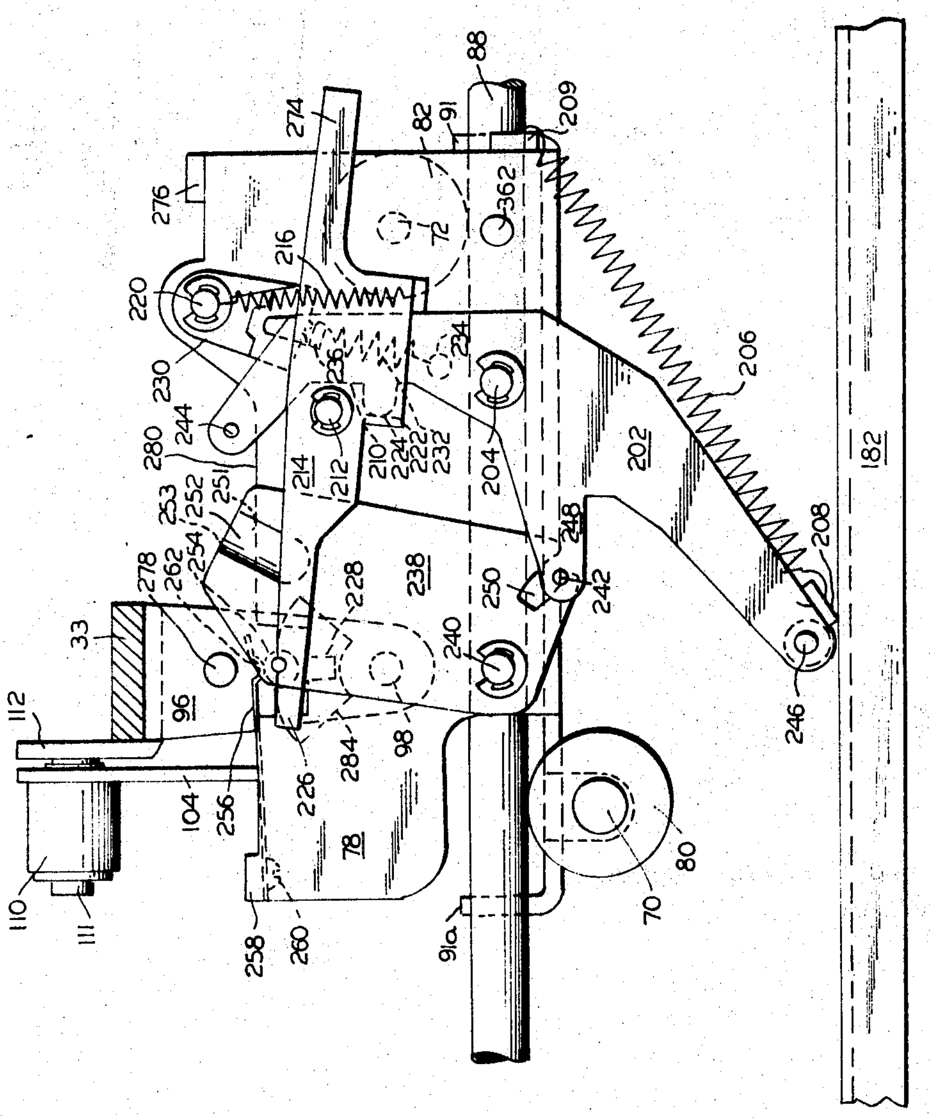
FIGS. 8, 9 and 10 are enlarged plan views of the tone arm actuating mechanism of FIG. 7, in various positions.

Referring to FIGS. 7 and 8, the actuating lever 202, mentioned above in connection with FIG. 5, is pivotally mounted on a shaft 204 fixed to the carriage 78, and is normally biased in the counterclockwise direction by a spring 206, tensioned between an ear 208 on the lever 202 and an ear 209 on the carriage 78. One end 210 of the actuating lever 202 is normally abutted by a shaft 212 secured to the carriage 78, so that the counterclockwise rotation of the lever 202 is restricted. A tone arm up-down lever 214 is pivotally mounted on the shaft 212 and is subjected to a counterclockwise rotation by the force of a spring 216 tensioned between an ear 218 thereon and a shaft 220 which is fixed to the carriage 78. Said rotation is normally restricted by the abutment of an ear 222 on the lever 214 with a tip 224 on the actuating lever 202. In this normal position described above, the leg 226 of the tone arm up-down lever 214 can not contact a tail 228 fixed to the tone arm 32, as shown in FIG. 2, while the record is playing. After the playing of the record is over, the large gear 148 is rotated in the direction of arrow I, FIG. 5, by the detecting means as described previously in accordance with the rotation of the small gear 130 in the direction of arrow H. This rotation of the gear 148 causes the parallel motion of the link 182 toward the carriage 78 as described above. Therefore, the link 182 pushes against the pin 246, fixed to one end of the actuating lever 202 in FIGS. 7 and 9, to rotate the actuating lever 202 clockwise about the shaft 204. As a result, the tip 224 on the actuating lever 202 moves away from the ear 222 of the tone arm up-down lever 214 so that said tone arm up-down lever 214 is rotated counterclockwise about the shaft 212 by the force of the spring 216 until one end 274 of said lever 214 abuts the stop 276 which is attached to the carriage 78. This rotation of the tone arm up-down lever 214 causes the leg 226 thereof to abut the tail 228 which is fixed to the tone arm 32 and to thereby vertically rotate the tone arm 32 clockwise, FIG. 2, about the horizontal pivots 34 and 35 so that the needle 31 is lifted upwardly from the record 60.

After the tone arm 32 has been lifted by the lifting means mentioned above, the tone arm 32 is returned to its rest position by the returning means described hereinafter.

Figure 11:
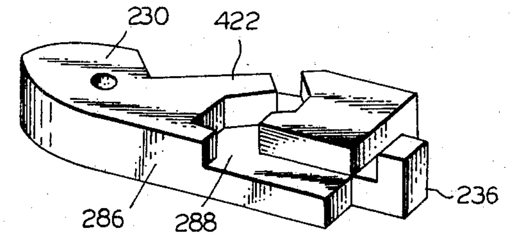
FIG. 11 is an enlarged perspective view of one of the parts employed in the mechanism illustrated in FIGS. 8, 9 and 10.

In FIGS. 7 and 8, a tone arm actuating lever 238 of elastic material, such as spring steel plate, is pivotally mounted on a shaft 240 which is fixed to the carriage 78. It will be observed in FIGS. 7 and 8 that the lower surface of the actuating lever 202 is provided with three pins 242, 244 and 246, and that the pin 242, fixed to an extension 248 on the lever 202, engages in a slot 250 in the tone arm actuating lever 238. Said actuating lever also has a depressed portion 252 therein. A clamp lever 230, shown in detail in FIG. 11, for clamping the actuating lever 202 is pivotally mounted on the shaft 220 which is fixed to the carriage 78. A spring 232 is connected between a pin 234, fixed to the lower surface of the actuating lever 202, and an ear 236 on the clamp lever 230.

Figure 9:
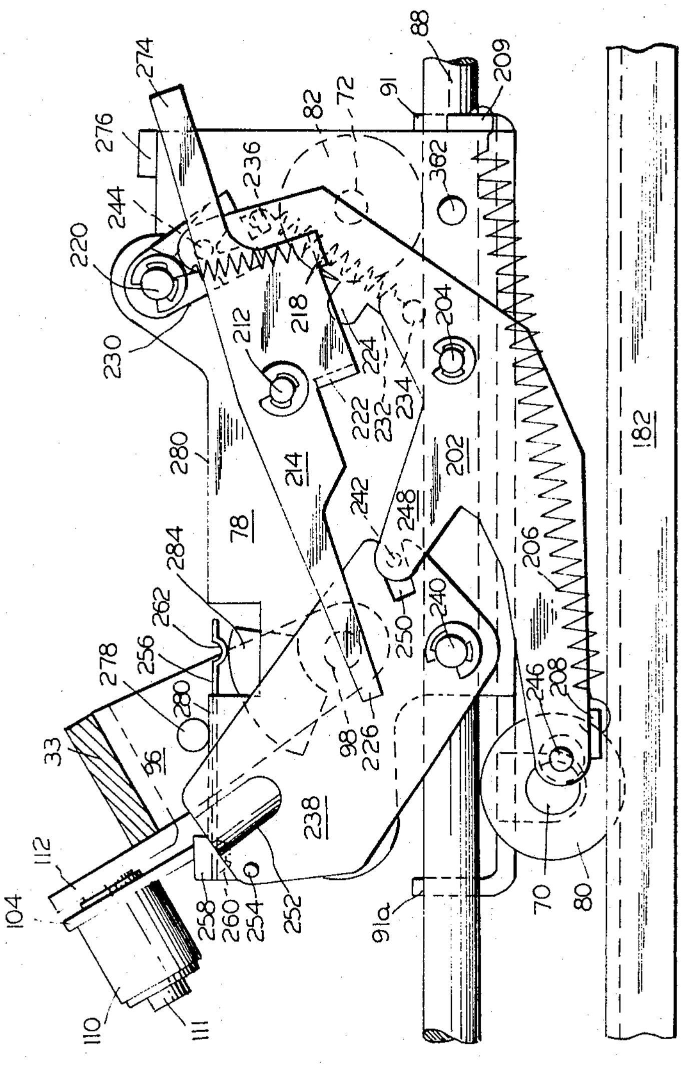
Figure 13:
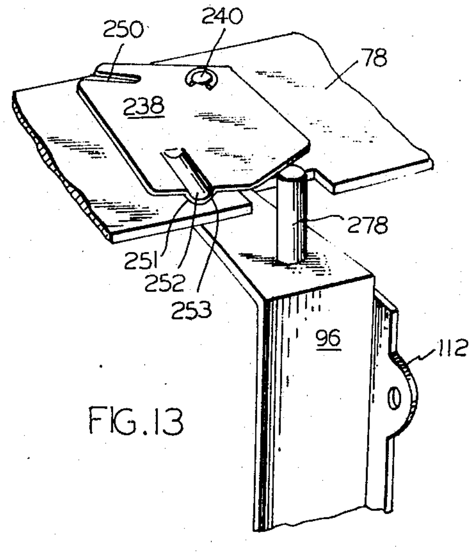

The tone arm actuating lever 238 rotates counterclockwise about the shaft 240 due to the motion of the pin 242 fixed to the lower surface of the extension 248 on the lever 202, during the clockwise rotation of the actuating lever 202 about the shaft 204, which in turn is caused by the parallel motion of the link 182 toward the carriage 78. When the needle 31 is positioned in its highest position, that is when the needle 31 is spaced the greatest distance from the record 60 on the turntable 56, the left bottom face 253 of the depressed portion 252 on the tone arm actuating lever 238 (see FIG. 13) urges a bracket rotating pin 278 fixed to the bracket 96, to swing the bracket 96 counterclockwise about the pivots 98 and 100, *i.e.* about the dot-dash line D in FIG. 2, until the pin 278 abuts an edge 280 (FIG. 9) of the carriage 78. After the pin 278 abuts the edge 280 of the carriage 78, the tone arm actuating lever 238 is still further rotated by the pin 242. Consequently the depressed portion 252 of the tone arm actuating lever 238, which is made of elastic material such as a plate spring, moves over the pin 278 and is disengaged from it. This condition is shown in FIG. 9. On the other hand, with the clockwise rotation of the actuating lever 202, FIG. 8, the pin 244, fixed to the lower surface of one end of the actuating lever 202 pushes against the left side face 286 of the clamp lever 230 and causes said clamp lever 230 to pivot counterclockwise about the shaft 220 in opposition to the force of the spring 232. When the follower lever 176 is pivoted counterclockwise, FIG. 6, to its largest extent about the shaft 180 by the cam 163, the actuating lever 202 is further rotated clockwise by the motion of the parallel link 182 toward the carriage 78 so that the pin 244 disengages from the side face 286 of the clamp lever 230 and the clamp lever 230 is rotated clockwise by the spring 232. Consequently, the pin 244 engages with a groove 288 on the clamp lever 230 by the abutment of the pin 244 with a side face of the groove 288. Counterclockwise rotation of the actuating lever 202 and clockwise rotation of the clamp lever 230 are mutually limited by said abutment. Thus the actuating lever 202 is clamped by the clamp lever 230, as shown in FIG. 15. The effect of this on the carriage 78 is illustrated in FIG. 9.

Figure 17:
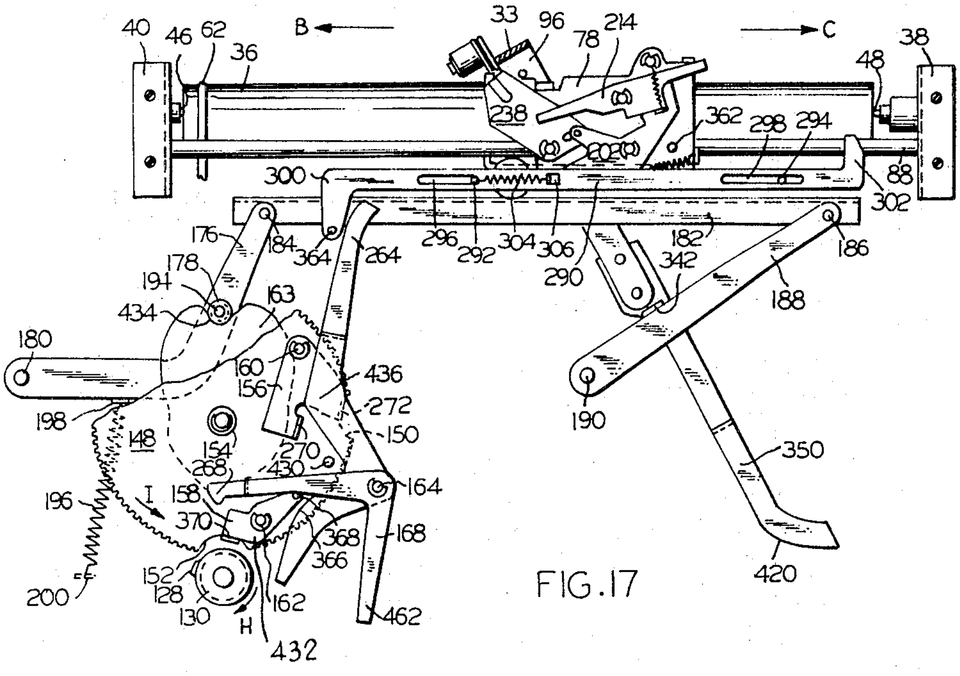
FIG. 17 is a bottom plan view of the parts of the automatic mechanism shown in FIG. 6 during the operation of automatically returning the tone arm, mounted on the carriage, to its rest position.

When the large gear 148 makes a further rotation in the direction of arrow I, FIG. 17, the follower lever 176 begins to pivot in the reverse direction, *i.e.* clockwise, due in part to the profile of the cam 163 and in part to the force of the spring 196, so that the link 182 moves away from the carriage 78 while remaining parallel to the rotatable cylinder 36, as described above. Said motion causes the link 182 to disengage from the pin 246 which is fixed to the actuating lever 202 because the actuating lever 202 remains clamped by the clamp lever 230. Thus, the tone arm 32 remains lifted and the bracket 96 remains pivoted counterclockwise because the actuating lever remains clamped by the clamp lever 230. In accordance with the counterclockwise rotation of the bracket 96, the rotational axis of the roller 102 is inclined with respect to the rotational axis of the cylinder 36. Thus, a component of rotating force is supplied from the rotatable cylinder 36 to the roller 102 in the direction of arrow C, FIG. 1. The carriage 78 is urged to align itself with the direction of said force causing the tone arm 32 to move to a position outside the perimeter of the record 60. Thus, the tone arm 32 is forceably returned to its rest position by the action of the returning means.

Referring to FIG. 17, after the link 182 is disengaged from the pin 246 which is fixed to the actuating lever 202, the second cutout 152 of the large gear 148 is moved to the point where the small gear 130 will mesh with the large gear. However, before the second cutout 152 of the large gear 148 is moved to said point where the small gear 130 will mesh with the large gear, two procedures which will be described below are executed; a pin 430, fixed to the upper surface of the large gear 148, pushes against the extension 366 of the detection lever 172 and causes a further counterclockwise rotation of the detection lever. The other procedure is the returning rotation of the second clutch lever 158, that is, the second clutch lever 158, pivotally mounted on the large gear 148, is rotated clockwise about its pivot pin 162 as its extension 432 abuts the outer periphery of the small gear 130 in accordance with the rotation of the rotation of the large gear 148 in the direction of arrow I.

It will be clear from FIG. 17 that when the second cutout 152 of the large gear 148 is positioned at the point where the small gear 130 would mesh with it, the large gear 148 is not brought into a meshing engagement by the second clutch lever 152 unless the second clutch lever is actuated by the detection lever 172. FIG. 17 indicates further that since the detection lever 172 has been rotated a large distance clockwise by the action of the pin 430, the detection lever 172 does not actuate the second clutch lever 158 unless the detection lever is actuated. It is further seen in FIG. 17 that the roller 178 on the follower lever 176 is positioned at the second recess 434 in the cam 163, due to the force of the spring 196, in order to stop the rotation of the large gear 148. Therefore, when the second cutout 152 of the large gear 148 is positioned at the point where the small gear 130 is positioned in it, the movement of the large gear 148 is stopped even when the small gear 130 is rotating. The state of the device as described above is illustrated in FIG. 17. Referring to FIGS. 6, 17 and 19, a slider 290 is slidably mounted on the upper surface of the subchassis 42 on the pins 292 and 294 which are fixed to the subchassis 42 and positioned in the slots 296 and 298 of the slider 290 so that the "to and fro" movement of the slider is limited by the physical dimensions of the slots 296 and 298. The slider 290 is provided with two ears 300 and 302 and a pin 364 is fixed to the ear 300. A spring 304 is tensioned between the pin 292 and an ear 306; said spring biasing the slider 290 in the direction of arrow B. Referring to FIG. 17, as the carriage 78 is moved in the direction of arrow C by the returning means as described above, the tone arm 32 abuts the rest 282 fixed to the chassis 44 (shown in FIG. 1) and as the carriage 78 continues to move, the inclination of the tone arm to the horizontal is gradually reduced. In the mean time, a long pin 362 fixed to the carriage 78 abuts the ear 302 of the slider 290 and causes the slider 290 to slide in the direction of arrow C against the force of the spring 304. Accordingly, the detection lever 172 is rotated clockwise about the shaft 164 by the abutment of the pin 364, which is fixed to the ear 300 of the slider 290, against the end 264 of the detection lever 172 extending downward through the opening 266 of the chassis 44. The extension 366 on the detection lever 172 abuts the pin 368, fixed to the second clutch lever 158, causing said second clutch lever 158 to rotate counterclockwise about the pin 162 and also causing the ear 370 of the second clutch lever 158 to collide with the projection 128. In this way, after the tone arm has moved to its rest position, the large gear 148 is again brought into a meshing engagement with the small gear 130 and thereinafter is continuously rotated in the direction of arrow I in accordance with the rotation of the small gear 130 in the direction of arrow H.

A feeding means for successively feeding single records to the turntable will now be described. Referring to FIGS. 5, 16, 18, 23, and 24, a record supporting spindle 134, extending upwards from the center of the turntable 56, is mounted on the tubular pedestal 120 so as to feed records one after the other to the playing position on the turntable 56 from the lower end of the stack 136 which is supported by said record supporting spindle 134. The structure of such a spindle is well understood in the art and therefore has not been shown in detail. The outline can be understood from FIG. 24, *i.e.* the spindle 134 comprises a movable keeper 138 for accomplishing a holdback function for the stack 136 of records so that in any record changing cycle only one record may be fed at a time to the turntable 56. A lever 140 which is capable of a limited angular rocking movement about a pin 142 as a fulcrum is fixed to the spindle 134 in order to displace the lower most record from the stack 136 which is resting on the record supporting shoulder 144 of the spindle 134 in order that said lowermost record can descend along the spindle 134 to the turntable. The lower end 146 of the lever 140 extends downward to the lower end of the spindle 134. A record steadying arm 132 rests on the upper surface of the stack 136. A U-shaped dropping lever 312 has a slot 314 in a lower plane portion 316 thereof and a sector-shaped portion 318 on the upper portion thereof and is rotatably mounted on the shaft 320, fixed to the chassis 44. The slot 314 of the dropping lever 312 is engaged with the lower end 146 of the lever 140.

Figure 23:
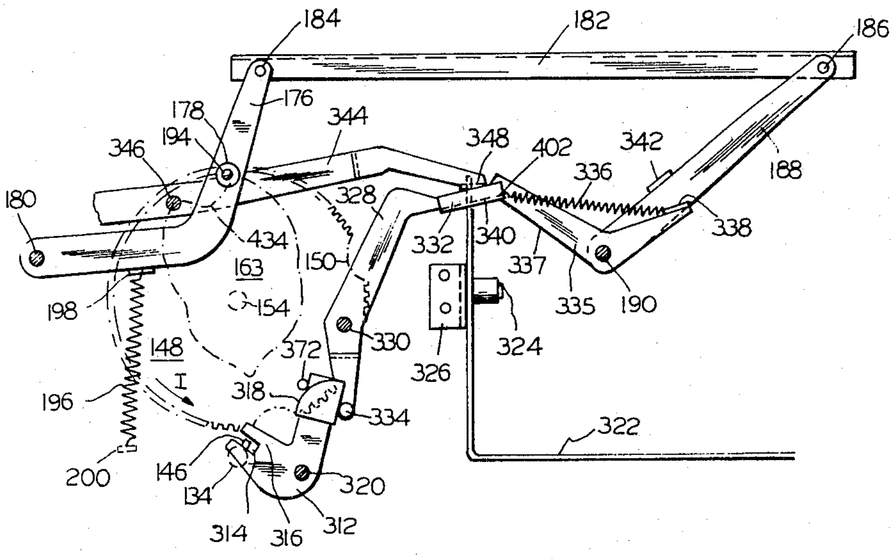
FIG. 23 is a bottom plan view of parts of the automatic record dropping mechanism in accordance with the present invention.

Referring to FIGS. 19, 23 and 24, as soon as the rotation of the large gear 148 is again initiated by the clutch means previously described, a pin 372 fixed to the lower surface of the large gear 148 urges the edge of the sector-shaped portion 318 of the dropping lever 312 in a direction to rotate the dropping lever 312 clockwise about the shaft 320 in conjunction with the rotation of the large gear 148 in the direction of arrow I, as shown in FIG. 23. By this operation, the lever 140 which has its lower end 146 engaged in the slot 314 in the dropping lever 312, is rocked about the pin 142 fixed in the spindle 134. This causes the lowermost record of the stack 136 to be displaced from the record supporting shoulder 144 and to descend the spindle 134 to the turntable 56.

The following description is directed to a starting means for forcedly starting the tone arm 32 such that the pickup needle 31 is positioned above the run-in groove of the various size records to be played.

After the lowermost record of the stack 136, supported on the spindle 134, descends along the spindle 134 to the turntable 56, the follower lever 176 is again rotated about the shaft 180 in the counterclockwise direction by the profile of the cam 163 in accordance with the rotation of the large gear 148 in the direction of arrow I. In turn, the link 182 makes its parallel motion toward the carriage 78 and urges the pin 246, fixed to the end of the actuating lever 202, in a direction to rotate the actuating lever 202 slightly clockwise about the shaft 204. Therefore the pin 244 fixed to the lower surface of the end of the actuating lever 202 is disengaged from the groove 288, formed in the clamp lever 230, and the clamp lever 230 is rotated clockwise about the shaft 220 by the force of the spring 232, tensioned between the ear 236 of the clamp lever 230 and the pin 234 which is fixed to the lower surface of the actuating lever 202, until the shaft 220, the ear 236 and the pin 234 are arranged on a straight line connecting the shaft 220 to the pin 234 as shown in FIG. 15'. As the cam 163 rotates further about the shaft 154 in accordance with the rotation of the large gear 148 in the direction of arrow I, the follower lever 176 is rotated in the reverse direction, *i.e.* clockwise about the shaft 180, in accordance with the profile of the cam 163 and in response to the force of the spring 196. The link 182 moves in a parallel motion and moves away from the carriage 78. Therefore, the actuating lever 202 starts to rotate counterclockwise about the shaft 204 under the bias of the spring 206, see FIGS. 10 and 18.

Figure 10:
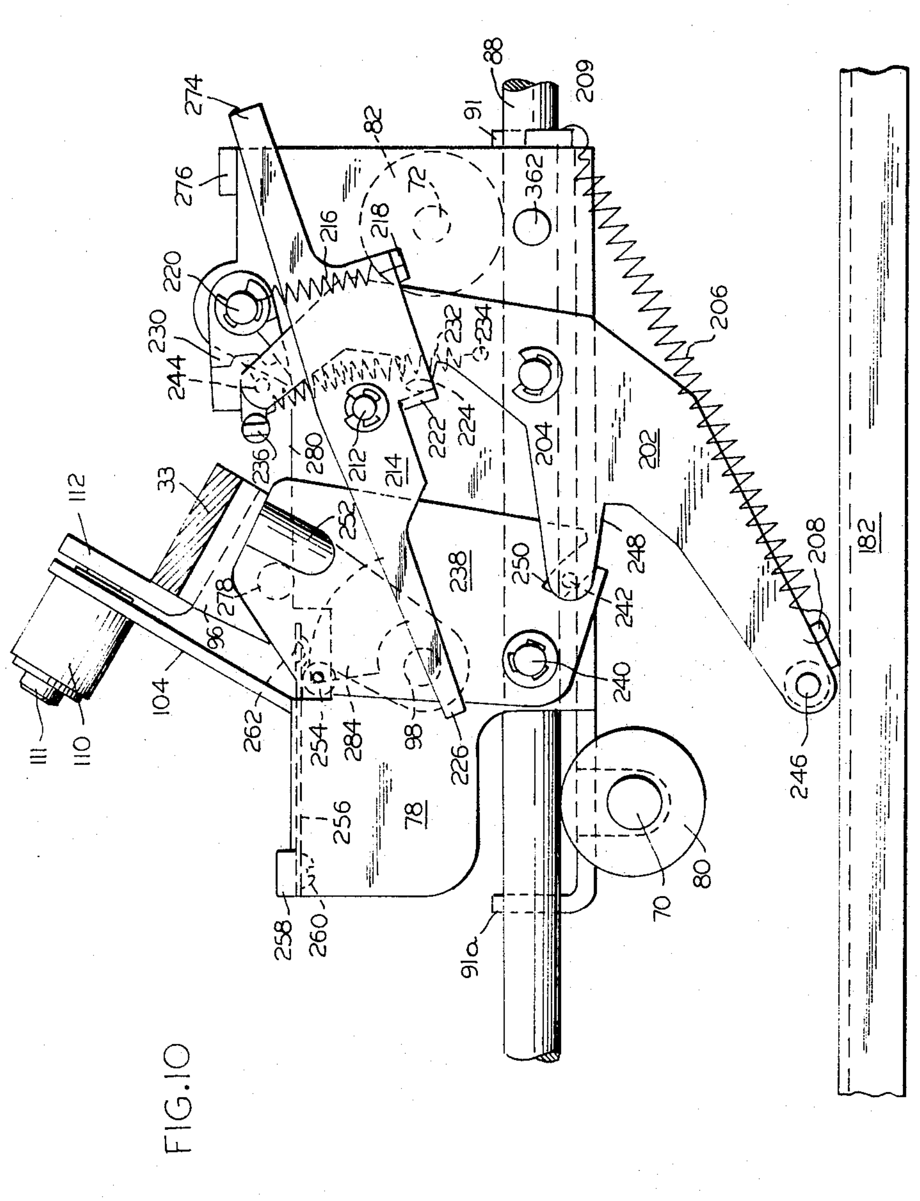

When the actuating lever 202 rotates counterclockwise about the shaft 204, the tone arm actuating lever 238 is rotated in the opposite direction, *i.e.* clockwise about the shaft 240 due to the engagement of the pin 242, fixed to the lower surface of the extension 248 of the lever 202, in the slot 250 in the tone arm actuating lever 238. The right lower side face 251 of the depressed portion 252 formed on the tone arm actuating lever 238, then urges the bracket rotating pin 278, fixed to the bracket 96, to swing the bracket 96 clockwise about the dot–dash line D, FIG. 2, until the pin 278 abuts the edge 280 of the carriage 78, as shown in FIG. 10, or until the swinging movement of the bracket 96 is restrained by the locator plate 322 as described hereinafter according to the size of the record to be played. After the pin 278 abuts the edge 280 of the carriage 78, the tone arm actuating lever 238 continues to rotate in response to the counterclockwise rotation of the actuating lever 202 so that the depressed portion 252 of the tone arm actuating lever 238, which is made of elastic material such as a plate spring, passes over the pin 278 and disengages from it. As the actuating lever 202 continues to rotate counterclockwise about the shaft 204 in response to the force of the spring 206, the pin 244, fixed to the lower surface of the end of the actuating lever 202, urges the right side face 422 of the clamp lever 230, shown in detail in FIG. 11, to rotate the clamp lever 230 clockwise about the shaft 220 in opposition to the force of the spring 232. Finally, the pin 244, fixed to the actuating lever 202, engages with the groove 288 and is clamped by the clamp lever 230 as shown in FIG. 16. Thus, the tip 224 on the actuating lever 202 is prevented from contacting the ear 222 on the tone arm up-down lever 214 and therefore the tone arm 32 is prevented from being lowered onto a record 60 positioned on the turntable 56. When the large gear 148 further rotates in the direction of arrow I, the follower lever 176 is further rotated clockwise due to its contact with the profile of the cam 163 and the force of the spring 196 so that the link 182 makes further parallel motion away from the carriage 78. Finally, the link disengages from the pin 246 which is fixed to the actuating lever 202 because the actuating lever 202 remains clamped by the clamp lever 230.

This operation causes the pickup 31, located on the tone arm 32, to move toward the center of a record placed on the turntable, and it also causes the rotational axis of the roller 102 to be forcedly inclined with respect to the rotational axis of the rotatory cylinder 36. Since the actuating lever remains clamped by the clamp lever, the tone arm 32 remains raised and the roller 102 remains inclined with respect to the rotational axis of the rotatable cylinder 36. Therefore, a component of rotating force is imparted from the rotatable cylinder 36 to the roller 102 in the direction of arrow B. As a result, the carriage 78 tends to align itself in the same direction and the tone arm 32 is moved to the run-in groove of the record to be played. In this way, the starting means forcedly begins to position the tone arm 32 such that the pickup needle 31 is positioned directly above the run-in groove of the record to be played.

Figure 18:
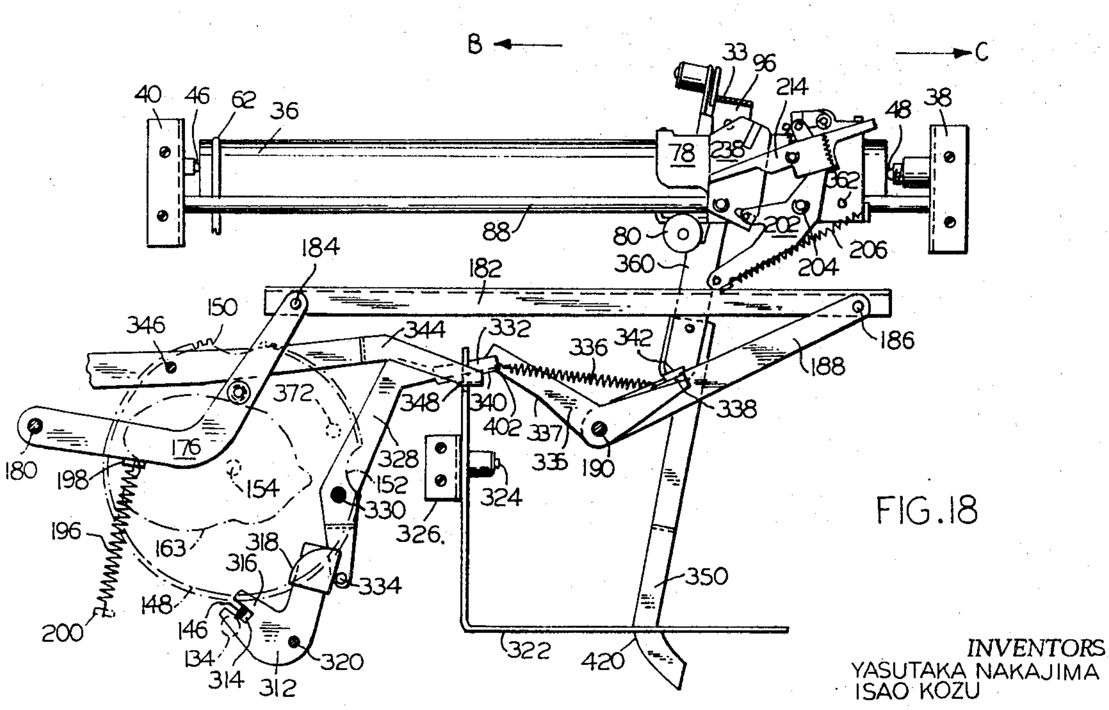
FIG. 18 is a bottom plan view of the parts of the automatic mechanism shown in FIG. 6 during the operation of automatically urging the tone arm, mounted on the carriage, to move to a record.
Figure 22:
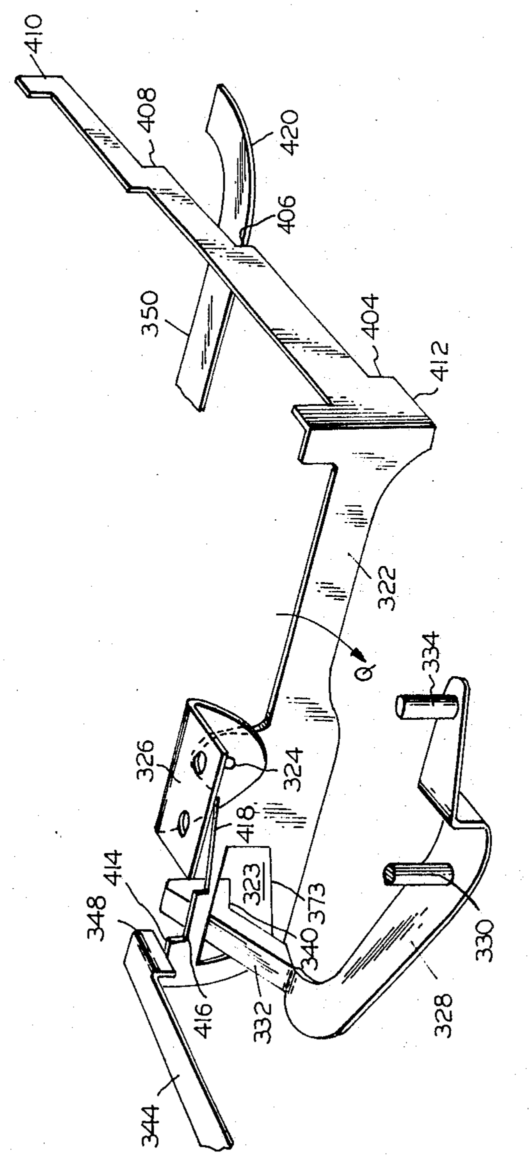
FIG. 22 is a partial perspective view of the mechanism of FIG. 18.

The following description is directed to a tone arm locating means for positioning the pickup needle 31 just above the run-in groove of the record to be played in connection with the starting means. Referring to FIGS. 18, 22 and 23, a locator plate 322 having an opening 323 therein shown in detail in FIG. 22, is pivotally mounted on a shaft 324 for vertical pivotal movement therearound. Shaft 324 is fixed to a supporting plate 326 which in turn is secured to the subchassis 42. A reset lever 328, also shown in detail in FIG. 22, is pivotally mounted on a shaft 330, fixed to the chassis 44, and has an inclined end portion 332 on one end which is engaged with the edge of opening 323 in the locator plate 322. A pin 334 is fixed to the other end of said reset lever 328 and extends upward. A clamp lever 335 is pivotally mounted on the shaft 190 fixed to the subchassis 42. A spring 336 is tensioned between an ear 338 on said clamp lever 335 and an ear 340 on the inclined end portion 332 of said reset lever. However, the counterclockwise rotation of the clamp lever 335 is restricted by the abutment of the ear 338 of said clamp lever 335 with an ear 342 on the lever 188. A selector lever 344 is rotatably mounted on the shaft 346 fixed to the chassis 44, and the end of the selector lever 344 which is not shown is connected to a conventional mechanism, also not shown, which automatically detects the size of a record to be played as the record descends along the spindle 134 and which drives the selector lever 344 to a position in accordance with the size of a record to be played.

As shown in FIGS. 3 and 4, a tone arm locating lever 350 is securely fixed to an extension 360 of the lower panel portion of the bracket 96 which is extended through an opening 361 in the carriage 78 and which is arranged so as to be positioned just under the pickup needle 31. It will be understood that the tone arm 32, the brackets 33 and 96, the U-shaped bracket 104, the roller 102 and the tone arm locating lever 350 can unitarily make a horizontal pivotal movement about the dot–dash line D. As described previously with regard to the feeding means, after the rotation of the large gear 148 is again initiated by the clutch means, a pin 372, fixed to the lower surface of the large gear 148 pushes against the edge of the sector-shaped portion of the dropping lever 312 causing said dropping lever 312 to rotate clockwise about the shaft 320 in accordance with the rotation of the large gear 148 in the direction of the arrow I. As the dropping lever 312 is rotated clockwise about the shaft 320, the reset lever 328 is rotated counterclockwise about the shaft 330 against the force of the spring 336 by the abutment of the pin 334, fixed to the reset lever 328 with the dropping lever 312. Then the locator plate 322, which tends to rotate by its own gravitational unbalance about the shaft 324 in the direction of arrow Q, shown in FIG. 22, rotates about the shaft 324 in the direction of arrow Q with the counterclockwise rotation of the reset lever 328 about the shaft 330 as follows:

In the normal state shown in FIG. 6, the reset lever 328 is urged to rotate clockwise about the shaft 330 by the force of the spring 336, but said rotation of the reset lever 328 is restricted by the abutment of the pin 334, fixed to the reset lever 328, with the dropping lever 312. The counterclockwise rotation of said dropping lever 312 is restricted by the engagement of the lower end 146 of the lever 140 in the slot 314 in the lower plane portion 316 of the dropping lever 312. In the situation described above, the locator plate 322 rotates about the shaft 324 in a direction against its gravitational unbalance and opposite to that of arrow Q by the abutment of the ear 340 of the inclined end portion 332 with the lower edge 373 of the opening 323 in the locator plate 322, FIG. 22. Even when the carriage 78 moves in the direction of arrow B or C, the tone arm locating lever 350 never engages with any portion of the locator plate 322. However, when the dropping lever 312 is rotated clockwise, as described above, by the action of the pin 372, the reset lever 328 is urged to rotate counterclockwise about the shaft 330 by the abutment of the pin 334, fixed on the end of the reset lever 328, with the dropping lever 312. By this operation, the ear 340 of the inclined end portion 332 of the reset lever 328 moves out of the opening 323 in the locator plate 322 and disengages from the lower edge 373 of the opening 323. The locator plate 322 can rotate vertically about the shaft 324 in the direction of arrow Q as a result of its own gravitational unbalance. At this time, referring to FIG. 23, since the lever 188 has already been rotated counterclockwise, as previously described, the clamp lever 335 is rotated counterclockwise about the shaft 190 by the force of the spring 336, tensioned between the ear 338 of the clamp lever 335 and the ear 340 on the inclined end portion 332 of the reset lever 328, until an extension 337 on the clamp lever 335 abuts the ear 340 on the reset lever 328. When the reset lever 328 is rotated counterclockwise about the shaft 330 to the greatest degree by the dropping lever 312, the upper end of the ear 340 on the reset lever 328 is clamped by the cutout 402 of the clamp lever 335. Therefore, after the pin 372 disengages from the sector-shaped portion 318 of the dropping lever 312, due to the rotation of the large gear 148, the locator plate 322 can rotate vertically about the shaft 324 in the direction of arrow Q because the reset lever 328 remains clamped by the clamp lever 335.

As shown in FIG. 22, the locator plate 322 is provided with steps and has four abutments 404, 406, 408 and 410 which are spaced at increasing vertical distances from the lowermost edge 412 of the locator plate 322. These abutments effect selective engagement with the tone arm locating lever 350 in accordance with the size of the record to be played. The locator plate 322 also has steps having three further abutments 414, 416 and 418, which are spaced at increasing radial distances from the shaft 324. These further abutments effect a selective engagement with the ear 348 which extends downward from the end of the selector lever 344, depending on the size of the record to be played. The four abutments 404, 406, 408 and 410 are arranged so as to be positioned just under a straight line connecting the needle 31 to the spindle 134 as shown by the radial line P in FIG. 1. The abutments 404, 406 and 408 are positioned, respectively, so that they will be just under the run-in grooves of a 7-inch, 10-inch and 12-inch diameter record, placed on the turntable 56. The abutment 410 is positioned beneath a point beyond the edge of a 12-inch diameter record and serves to bring the tone arm 32 onto the rest 282.

Referring to FIGS. 18, 21 and 22, as stated previously, the end of the selector lever 344 not visible in the FIGS. is connected to a conventional mechanism which automatically detects the size of the record to be played as it descends along the spindle 134 from the stack 136. The ear 348 of the selector lever 344 is displaced so as to face one of said plurality of further abutments 414, 416 and 418 depending on the size of the record as determined by the conventional mechanism (not shown) as follows:

When a 7-inch diameter record descends along the spindle 134 to the turntable 56, the ear 348 is displaced so as to be positioned above the abutment 414.

When a 10-inch diameter record descends along the spindle 134 to the turntable 56, the ear 348 is displaced so as to be positioned above the abutment 416.

When a 12-inch diameter record descends along the spindle 134 to the turntable 56, the ear 348 is displaced so as to be positioned above the abutment 418.

When the last record of the stack 136 has been played, the ear 348 is displaced to a point beyond the abutment 414 by a mechanism which is conventional and well known in the art.

On the other hand, the abutments 404, 406, 408 and 410 which are spaced at increasing vertical distances from the lowermost edge 412 of the locator plate 322 are arranged in such a way that when the carriage 78 is urged to move in the direction of arrow B by the starting means described previously, the edge 420 of the tone arm locating lever 350 engages with one of the plurality of abutments 404, 406, 408 and 410 depending on the size of the record placed on the turntable 56 as follows:

The locator plate 322 has already been set in free vertical rotation about the shaft 324 in the direction of arrow Q as described previously.

a. When a 7-inch diameter record is placed on the turntable 56 the edge 420 of the tone arm locating lever 350 engages with the abutment 404 because the locator plate 322 is prevented from rotating more than a small degree due to the abutment of the ear 348 of the selector lever 344 with the further abutment 414.

b. When a 10-inch diameter record is placed on the turntable 56 the edge 420 at the tone arm locating lever 350 engages with the abutment 406 because the locator plate 322 is allowed to rotate a greater degree than in case *a* because the ear 348 now abuts with the further abutment 416. This case is illustrated in FIGS. 18 and 21.

c. When a 12-inch diameter record is placed on the turntable 56 the edge 420 of the tone arm locating lever 350 engages with the abutment 408 because the locator plate 322 is allowed to rotate a greater degree than in case *b* because the ear 348 abuts with the further abutment 418.

d. After the completion of the playing of the last record, the edge 420 engages with the abutment 410 because the locator plate 322 rotates through the highest permissible angle in such a way that the ear 348 does not abut any of the plurality of further abutments 414, 416 and 418. Instead, the abutment 414 abuts the under surface of the subchassis 42.

In accordance with the above, as the carriage 78 is urged to move in the direction of arrow B by the starting means described previously, the tone arm locating lever 350 engages with one of the plurality of abutments 404, 406 and 408 in accordance with the size of the record to be played. The needle 31 of the pickup 30 is guided to the position just above the run-in groove of the record to be played, and when the last record has been played the needle 31 is guided to the position just above the rest 282.

The edge 420 of the end portion of the tone arm locating lever 350 is properly curved and guides the needle 31 of the tone arm 32. When the tone arm locating lever 350 engages with one of the plurality of abutments 404, 406, 408 and 410, as shown in FIG. 18, the tone arm 32 and the tone arm locating lever 350 have already been inclined to the horizontal, as previously described. Consequently, the point on the edge 420 which engages with the respective abutment shifts continuously along the edge 420 as the inclination of the tone arm 32 to the horizontal is rectified by the gradual movement of the carriage 78 in the direction of arrow B. The pickup needle 31 of the tone arm 32, positioned just above the edge 420 of the tone arm locating lever 350, is not always guided so as to be positioned exactly above the run-in groove of the record to be played. Therefore, the edge 420 of the end portion of the tone arm locating lever 350 is properly curved so that the needle 31 of the tone arm 32 is always guided so as to be positioned above the run-in groove of the record to be played when the tone arm locating lever 350 engages with one of the abutments when the tone arm is inclined to the horizontal. This curved portion of the tone arm locating lever 350 is designed for the case where a record having a 7-inch diameter is played because the degree of inclination of the tone arm 32 to the horizontal is a maximum when the tone arm locating lever 350 engages with the abutment 404 for the playing of a 7 inch record. Thus, the tone arm locating means guides the pickup needle 31 of the tone arm 32 so as to locate just above the run-in groove of the record to be played.

The following description is directed to a tone arm lowering means for lowering the tone arm 32 so that the pickup needle 31 engages with the run-in groove of the record to be played after the tone arm 32 is located just above the run-in groove of said record by the tone arm locating means described above.

When the tone arm locating lever 350 is engaged with one of the abutments, for example the abutment 406 as shown in FIG. 18, the inclination of the tone arm 32 to the horizontal is rectified by the gradual movement of the carriage 78 in the direction of arrow B. As the inclination of the tone arm 32 to the horizontal is lessened due to the gradual movement of the carriage 78 in the direction of arrow B, the longitudinal center line of the tone arm 32 becomes nearly parallel with a line tangent to the record groove at the point contacted by the needle 31. The follower lever 176 is again rotated counterclockwise about the shaft 180 as a result of its contact with the profile of the cam 163. As a result, the link 182 moves parallel with the rotary cylinder 36 and toward the carriage 78 and finally urges the pin 246, fixed to the end of the actuating lever 202, to rotate the actuating lever slightly in a clockwise direction about the shaft 204. Therefore, the pin 244 fixed to the lower surface of one end of the actuating lever 202 is unclamped from the groove 288 formed in the clamp lever 230. The clamp lever 230 is then rotated clockwise about the shaft 220 by the force of the spring 232 tensioned between the ear 236 and the pin 234 fixed to the lower surface of the actuating lever 202 until the shaft 220, the ear 236 and the pin 234 are displaced so as to be positioned on a straight line connecting the shaft 220 with the pin 234 as shown in FIG. 14. As the cam 163 rotates further in association with the rotation of the large gear 148 in the direction of arrow I, the follower lever 176 rotates in the reverse direction, *i.e.* clockwise about the shaft 180 as a result of its contact with the profile of the cam 163 and the force of the spring 196. In turn, the link 182 moves away from the carriage 78 and the actuating lever 202 starts to rotate counterclockwise about the shaft 204 as a result of the force of the spring 206, as shown in FIGS. 10 and 18. Then, the tip 224 of the actuating lever 202 urges the ear 222 of the tone arm up–down lever 214 to rotate the lever 214 clockwise about the shaft 212. As a result, the leg 226 of the tone arm up–down lever 214 is moved away from the tail 228 of the tone arm 32. The tone arm 32, therefore, rotates about the horizontal pivots 34 and 35 so as to move downward to the run-in groove of a record to be played.

On the other hand, because the follower lever 176 is rotated clockwise about the shaft 180 due to its contact with the profile of the cam 163 and the force of the spring 196, the ear 342 on the lever 188 finally abuts the ear 338 on the clamp lever 335 causing said clamp lever 335 to rotate about the shaft 190 in the clockwise direction, FIG. 18. After the needle 31 has engaged with the run-in groove of the record as a result of the lowering of the pickup 30, the ear 342 on the lever 188 causes the clamp lever 335 to rotate and to disengage the ear 340 on the reset lever 328 from the cutout 402 of the clamp lever 335. As a result, the reset lever 328 is unclamped from the clamp lever 335 and is instantly rotated clockwise by the force of the spring 336 tensioned between the ear 340 and the ear 338 of the clamp lever 335. This causes the ear 340 on the inclined end portion 332 of the reset lever 328 to move into the opening 323 of the locator plate 322 under the force of the spring 336. The locator plate is instantly pivoted about the shaft 324 in the direction opposite to arrow Q by the abutment of the ear 340 of the reset lever with the lower edge 373 of the opening 323. The edge 420 of the tone arm locating lever 350, therefore, disengages from the abutments 404, 406 and 408 and the tone arm is now free to move "to and fro". As the follower lever 176 is further rotated clockwise about the shaft 180 by the profile of the cam 163 and the force of the spring 196, the link 182 moves further away from the carriage 78. Finally, the link 182 disengages from the pin 246 of the actuating lever 202 because the counterclockwise rotation of the actuating lever 202, resulting from the force of the spring 206, is stopped by the abutment of the end 210 of the actuating lever 202 with the shaft 212. Said operations leave to tone arm 32 and the carriage 78 free to move to and fro and to achieve an excellent reproduction of the record.

The lever 140 is now reset in position to feed another record to the turntable with the next automatic cycle because the dropping lever 312 has been rotated counterclockwise due to the abutment of the dropping lever 312 with the pin 334 on the reset lever 328 which is rotated clockwise by the force of the spring 336.

When the large gear 148 completes nearly a whole rotation, the first clutch lever 156, pivotally mounted on the gear 148, is rotated clockwise about its pivot pin 160 as the extension 428 thereon abuts the outer periphery of the small gear 130 in accordance with the rotation of the gear 148 in the direction of arrow I. When the first cutout 128 of the gear 148 is positioned opposite the small gear 130, the roller 178 on the follower lever 176 is urged into the first recess 424 of the cam 163 by the force of the spring 196 in order to stop the rotation of the gear 148.

The following description will be directed to the means for activating the automatic mechanism of the present phonograph record changer at any time during the reproduction of a record in order to reject said record and to introduce the next record to be played.

In FIGS. 5 and 20, a pin 438 is fixed to the upper surface of a long lever 440 and extends through a slot 442 in the phonograph chassis 44 and slidably supports the long lever 440 under the chassis 44 by means of a plain washer 444. One end of the long lever 440 is pivotally connected by a pin 446 to a lever 448 which is rotated by a knob 452 about a shaft 450 fixed to the chassis 44. The other end of the long lever 440 is provided with a pin 454 extending through an opening 456 in the chassis 44. A spring 458 is tensioned between an ear 460 on the chassis 44 and the pin 438 in order to normally bias the long lever 440 toward the center of the chassis 44. To and fro movement of the long lever 440 is limited by the dimensions of the slot 442 in the chassis 44.

When the tone arm 32 is resting on the rest 282, *i.e.* its original position, and the carriage is positioned most closely to the side plate 38, *i.e.* at is original position, the knob 452 can be rotated clockwise. This manipulation of the knob 452 causes the long lever 440 to pull away from the center of the chassis so that the force thus applied to the pin 454 rotates the friction lever 168 about the shaft 164 in a counterclockwise direction due to the abutment of the pin 454 with the leg 462 of the friction lever. The first clutch lever 156 is then rotated counterclockwise about the pin 160 by the abutment of the ear 270 with the extension 268 on the friction lever 168. This causes the ear 272 on the lever 156 to collide with the projection 128 on the small gear 130. Therefore, the large gear 148 is brought into a meshing engagement with the small gear 130. Thereafter, as previously described in detail, the automatic mechanism of the present phonograph record changer executes its own operation.

When it is desired to return the tone arm 32 at any time during reproduction of the record to its rest position in order to introduce the next record, the knob 452 can be rotated clockwise, *i.e.* in the same direction as in the initial operation described above. Similarly to the initiating operation described above, this manipulation makes the gear 148 start to rotate in the direction of arrow I and causes the automatic mechanism of the present phonograph record changer to execute its own operation. Therefore, the tone arm is moved to the rest position.

The present phonograph record changer is provided with a couple of brake means which are effective in smoothly moving the tone arm. From the foregoing detailed description, It will be obvious that the tone arm 32 can make a smooth pivotal movement about the pivots 98 and 100 with very slight resistance in the horizontal plane. Therefore, when the tone arm 32 is forcedly inclined to the horizontal by the tone arm actuating lever 238 during the steps of returning the tone arm 32 to its rest position or starting the tone arm 32 toward a position just above the run-in groove of a record during the record changing cycle, the tone arm 32 easily swings to and fro because of the rebounds of the bracket 96 caused by the vibration which occurs when the pin 278 fixed to the bracket 96 abuts the edge 280 of the carriage 78.

Figure 12:
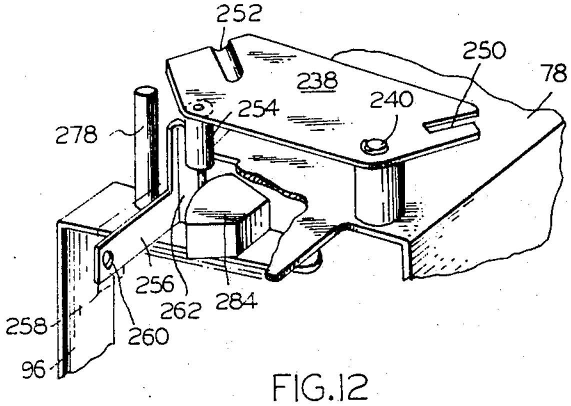
FIGS. 12 and 13 are fragmentary perspective views of the tone arm actuating mechanism.

Referring to FIGS. 3, 8 and 12, a leaf spring 256, provided with an annular raised portion 262 at the end thereof, is secured to an ear 258 on the carriage 78 by a screw 260. A brake 284 is fixed to the upper surface of the bracket 96 and the round periphery of said brake 284 has its center at the pivot 98. In a normal condition, a brake actuating pin 254, fixed to the tone arm actuating lever 238, pushes against the annular raised portion 262 of the leaf spring 256 and bends the leaf spring 256 in a counterclockwise direction. The leaf spring 256 does not contact the brake 284 so the bracket 96 can make a smooth pivotal movement about the pivots 98 and 100. Since the tone arm actuating lever 238 moves from its usual position due to the actuating lever 202, the brake actuating pin 254, fixed to the tone arm actuating lever 238, is disengaged from the annular raised portion 262 on the leaf spring 256 so that the annular raised portion 262 on the leaf spring contacts the round periphery of the brake 284 fixed to the bracket 96 and imposes a frictional restraint on the to and fro movement of the bracket 96. When the tone arm 32 is forcedly inclined by the tone arm actuating lever 238, the movement of the tone arm 32, which moves in unison with the bracket 96, is kept steady by said frictional restraint imposed on the to and fro movement of the bracket 96. When the bracket rotating pin 278 fixed to the bracket 96 abuts the edge 280 of the carriage 78, the rebounds of the bracket 96, due to the vibration which can occur, are suppressed by said frictional restraint which is imposed on the to and fro movement of the bracket 96.

In the present phonograph record changer, it will be understood that the lowermost record of the stack 136 supported on the record supporting spindle 134 does not descend said spindle 134 to the turntable 56 except when the tone arm 32 has been returned by the aforesaid returning means to its rest position or to a position beyond the path of the outer periphery of the record descending from the stack 136 to the playing position on the turntable 56. There are two reasons for this: (1) After the bracket 96 is forcedly rotated counterclockwise by the returning means, the large gear 148 does not move, due to the location of the second cutout 152 of said gear 148, until the tone arm 32 returns to its rest position to allow the clutch means to again bring the large gear 148 into a meshing engagement with the small gear 130. (2) The feeding means for feeding records one at a time in succession to the turntable 56 is actuated by the pin 372 fixed to the large gear 148, after the large gear 148 is again brought into a meshing engagement with the small gear 130 by said clutch means. On the other hand, the friction lever 168 is so arranged as not to engage with the second clutch 158 in any case. Consider the case in which the friction lever 168 is rotated counterclockwise by the manipulation of the knob 452 when the second cutout 152 is positioned at the point where the gears would normally mesh. Even in such a case, the large gear 148 is not brought into a meshing engagement by the manipulation of the knob 452. Therefore, even when, for some accidental reason, it takes the tone arm 32 a very long time to be returned to its rest position, for example, when the tone arm 32 is gripped with the hand, the lowermost record of the stack 136 does not descend along the record supporting spindle 134 before the tone arm 32 returns to its rest position. Consequently, under no circumstances can the tone arm 32 be damaged due to a collision of the tone arm 32 with a record which is descending along the record supporting spindle 134 to the turntable 56.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A phonograph record changer comprising: a chassis; a turntable rotatably mounted on said chassis; a tone arm having a pickup needle secured to one end thereof; said tone arm being movably supported so as to move said needle in a straight line, which line includes the turntable center; a carriage mounted on said chassis for movement along a path parallel with said straight line of motion of said pickup needle; a bracket pivotally mounted on said carriage for rotation about a first axis and supporting said tone arm, so that said tone arm is movable in a plane generally parallel to said turntable; a cylinder having a longitudinal axis extending parallel with the path of said carriage, said cylinder being rotatably mounted on said chassis; a roller is rotatably mounted on said bracket, and having an axis of rotation extending perpendicular to a line drawn between said pickup needle and the pivot axis of said bracket, and which is pressed against said cylinder so as to be rotated by rotation of said cylinder; lifting means mounted on said carriage and engaged with said tone arm to lift said tone arm to raise the pickup needle from the record; bracket rotating means including a bracket rotating pin fixed to said bracket and which limits rotation of said bracket by abutment of said pin against said carriage, a tone arm actuating lever of an elastic material and which is movably mounted on said carriage and having an annular depressed portion engageable with said pin for driving said pin, means mounted on said carriage connected with said tone arm actuating lever for rotating said tone arm actuating lever in one direction so that said annular depressed portion drives said pin to rotate said bracket horizontally in one direction so as to incline said rotation axis of said roller with respect to said axis of said cylinder so that said roller and said cylinder cooperate to effect a returning motion of said tone arm to its rest position, said annular depressed portion being movable over said pin and disengaged from said pin by further rotation of said tone arm actuating lever when said bracket is limited in its rotation by said abutment of said pin against said carriage, and for rotating said tone arm actuating lever in the reverse direction so that said annular depressed portion again drives said pin to rotate said bracket horizontally in another direction so as to incline said rotation axis of said roller with respect to said axis of said cylinder so that said roller and said cylinder cooperate to effect starting motion of said tone arm toward the center of the record; feeding means on said chassis for feeding records singly from a spindle onto said turntable; driving means connected to said lifting means, said bracket rotating means and said feeding means for driving the respective means; detecting means connected to said driving means for initiating said driving means in response to a quick movement of said carriage due to entry of said pickup needle into a run-in groove of a record; and tone arm locating means connected with said tone arm for restricting the movement of said tone arm toward the center of the record so as to lead the pickup needle into a run-in groove of a record.

2. A phonograph record changer as claimed in claim 1, further comprising a couple of brake means, one of which is attached to the bracket and the other of which is attached to the carriage, said one brake being frictionally engaged with the other, one of said brake means imposing a frictional restraint against the rotation of said bracket by its frictional engagement with said other brake means while the tone arm actuating lever is positioned at other than its original position.

3. A phonograph record changer as claimed in claim 2, wherein said couple of brake means comprise a leaf spring mounted on said carriage and having an annular enlarged portion, a brake mounted on said bracket, a brake actuating pin fixed to the tone arm actuating lever, said brake actuating pin abuts said annular enlarged portion for moving said annular enlarged portion away from said brake when said tone arm actuating lever is at the original position so that said annular enlarged portion disengages from said brake, and said brake actuating pin moves out of engagement with said annular enlarged portion of said leaf spring during movement of said tone arm actuating lever from said original position so that said annular enlarged portion engages with said brake and imposes frictional restraint against the rotation of said bracket.

4. A phonograph record changer comprising: a chassis; a turntable rotatably mounted on said chassis; a tone arm having a pickup needle secured to one end thereof, said tone arm being movably supported so as to move said needle in a straight line, which line includes the turntable center; a carriage mounted on said chassis for movement along a path parallel with said straight line of motion of said pickup needle; a bracket pivotally mounted on said carriage for rotation about a first axis and supporting said tone arm, so that said tone arm is movable in a plane generally parallel to said turntable; a cylinder having a longitudinal axis extending parallel with the path of said carriage, said cylinder being rotatably mounted on said chassis; a roller rotatably mounted on said bracket, and having an axis of rotation extending perpendicular to a line drawn between said pickup needle and the first axis, and which is pressed against said cylinder so as to be rotated by rotation of said cylinder; lifting means mounted on said carriage and engaged with said tone arm to lift said tone arm to raise the pickup needle from the record; returning means mounted on said carriage and engageable with said bracket to rotate said bracket about said first axis in one direction so as to forcedly incline said rotation axis of said roller with respect to said axis of said cylinder so that said roller and said cylinder cooperate to effect a returning motion of said tone arm to its rest position; starting means mounted on said carriage and engageable with said bracket to rotate said bracket in another direction about said first axis so as to forcedly incline said rotation axis of said roller with respect to said axis of said cylinder so that said roller and said cylinder cooperate to effect starting motion of said tone arm toward the center of the record; feeding means on said chassis for feeding records singly from a spindle onto said turntable; driving means connected to said lifting means, said returning means, said starting means and said feeding means for driving the respective means; detecting means connected to said driving means for initiating said driving means to drive said lifting means and said returning means in response to a quick movement of said carriage due to entry of said pickup needle into a runout groove of a record so that said tone arm moves to its rest position, and also for initiating said driving means to drive said feeding means and said starting means in response to a movement of said carriage upon arrival of said tone arm to its rest position so that said feeding means feeds a next record onto said turntable and said tone arm moves toward the center of the record; and tone arm locating means connected with said tone arm for restricting the movement of said tone arm toward the center of the record so as to lead the pickup needle into a run-in groove of a record.

5. A phonograph record changer as claimed in claim 4, wherein said driving means includes a small gear secured to said turntable, a large gear which is adapted to be brought into meshing engagement with said small gear and which has to cutouts in the periphery thereof, and a cam secured to said large gear and engaged with said lifting means to drive said lifting means, said returning means, said feeding means and said starting means sequentially upon rotation of said large gear; and said detecting means includes two clutch levers which are mounted on said large gear at the positions adjacent to said cutouts, respectively and which are operative to bring said large gear into meshing engagement with said small gear, and a detection lever connected to said clutch levers for actuating said clutch levers upon movement of said carriage, whereby one of said clutch levers is actuated by said detection lever upon said quick movement of said carriage so as to bring said large gear into meshing engagement with said small gear so that said cam drives said lifting means and said returning means, and the other of said clutch levers is actuated by said detection lever in response to said movement of said carriage upon arrival of said tone arm to its rest position so as to bring said large gear into meshing engagement with said small gear so that said cam drives said feeding means and said starting means.

6. A phonograph record changer as claimed in claim 5, wherein said detecting means further comprises a friction lever engaged by said detection lever and frictionally driven by the rotating movement of said detection lever upon said quick movement of said carriage for driving one of said clutch levers and the other of said clutch levers is directly actuated by the opposite rotating movement of said detection lever, and a slide means which is adapted to be moved by said movement of said carriage upon arrival of said tone arm at its rest position and connected to said detection lever for giving to it said opposite rotating movement.

7. A phonograph record changer as claimed in claim 4, wherein said tone arm locating means includes a locator plate which has a plurality of abutments formed thereon and which is mounted on said chassis, a tone arm locating lever connected to said tone arm which moves in unison with said tone arm and moves into selective engagement with one of said abutments, whereby each of the contact points between said abutments and said locating lever is positioned under a run-in groove of a record of a different size.

8. A phonograph record changer as claimed in claim 7, wherein one end portion of said tone arm locating lever at which said tone arm locating lever contacts said locator lever is so curved that said pickup needle of said tone arm positions just above each of run-in grooves of records on said turntable regardless of the inclination of said locating lever.